United States Patent
Tanaka

(10) Patent No.: US 9,177,236 B2
(45) Date of Patent: Nov. 3, 2015

(54) IMAGE FORMING APPARATUS AND METHOD, NON-TRANSITORY COMPUTER READABLE MEDIUM, AND IMAGE FORMING SYSTEM

(71) Applicant: FUJI XEROX Co., Ltd., Minato-ku, Tokyo (JP)

(72) Inventor: Hironori Tanaka, Kanagawa (JP)

(73) Assignee: FUJI XEROX CO., LTD, Tokyo (JP)

(*) Notice: Subject to any disclaimer, the term of this patent is extended or adjusted under 35 U.S.C. 154(b) by 17 days.

(21) Appl. No.: 14/190,978

(22) Filed: Feb. 26, 2014

(65) Prior Publication Data

US 2015/0015908 A1 Jan. 15, 2015

(30) Foreign Application Priority Data

Jul. 10, 2013 (JP) .................. 2013-145019

(51) Int. Cl.
G06K 15/00 (2006.01)
H04N 1/00 (2006.01)
H04N 1/32 (2006.01)
H04N 1/44 (2006.01)

(52) U.S. Cl.
CPC ........ G06K 15/4095 (2013.01); H04N 1/00233 (2013.01); H04N 1/00307 (2013.01); H04N 1/00344 (2013.01); H04N 1/32106 (2013.01); H04N 1/4413 (2013.01); H04N 1/4433 (2013.01); H04N 2201/0094 (2013.01); H04N 2201/3202 (2013.01); H04N 2201/3205 (2013.01); H04N 2201/325 (2013.01); H04N 2201/3208 (2013.01); H04N 2201/3276 (2013.01)

(58) Field of Classification Search
CPC ................................. G06K 15/4095
See application file for complete search history.

(56) References Cited

U.S. PATENT DOCUMENTS

2013/0141754 A1* 6/2013 Moroi .................. 358/1.14

FOREIGN PATENT DOCUMENTS

JP 11-123859 A 5/1999

* cited by examiner

Primary Examiner — Barbara Reinier
Assistant Examiner — Lennin Rodriguezgonzalez
(74) Attorney, Agent, or Firm — Sughrue Mion, PLLC

(57) ABSTRACT

An image forming apparatus that performs printing processing using first identification information for identifying, in a first system in a particular organization that performs first authentication, a user in the first authentication, including an obtaining unit that obtains print data from a logical printer in a second system that is a cloud service system that performs second authentication, wherein information for identifying a user in the second system is second identification information, and the print data includes the second identification information; a reference unit that refers to relationship information between the first and second identification information when the obtained print data includes the second identification information; and a controller that controls printing processing of the obtained print data obtained using the first identification information. Identification information of the user, which is temporarily issued in the first system, is used as the first identification information.

7 Claims, 14 Drawing Sheets

| LOGICAL PRINTER ID | CLOUD ID | IN-HOUSE ID |
|---|---|---|
| Printer-A | tanaka@cloudprint.com | fx1234 |
|  | suzuki@cloudprint.com | fx9999 |
| Printer-B | tanaka@cloudprint.com | fx1234 |

| LOGICAL PRINTER ID | CLOUD ID |
|---|---|
| Printer-A | tanaka@cloudprint.com |
|  | suzuki@cloudprint.com |
| Printer-B | tanaka@cloudprint.com |

| CLOUD ID | IN-HOUSE ID |
|---|---|
| tanaka@cloudprint.com | fx1234 |
| suzuki@cloudprint.com | fx9999 |
| tanaka@cloudprint.com | fx1234 |

| LOGICAL PRINTER ID | CLOUD USER ID | IN-HOUSE USER ID |
|---|---|---|
| Printer-A | tanaka@cloudprint.com | fx1234 |
| | suzuki@cloudprint.com | fx9999 |
| | sato@cloudprint.com | fx2345 |
| Printer-B | tanaka@cloudprint.com | fx1234 |

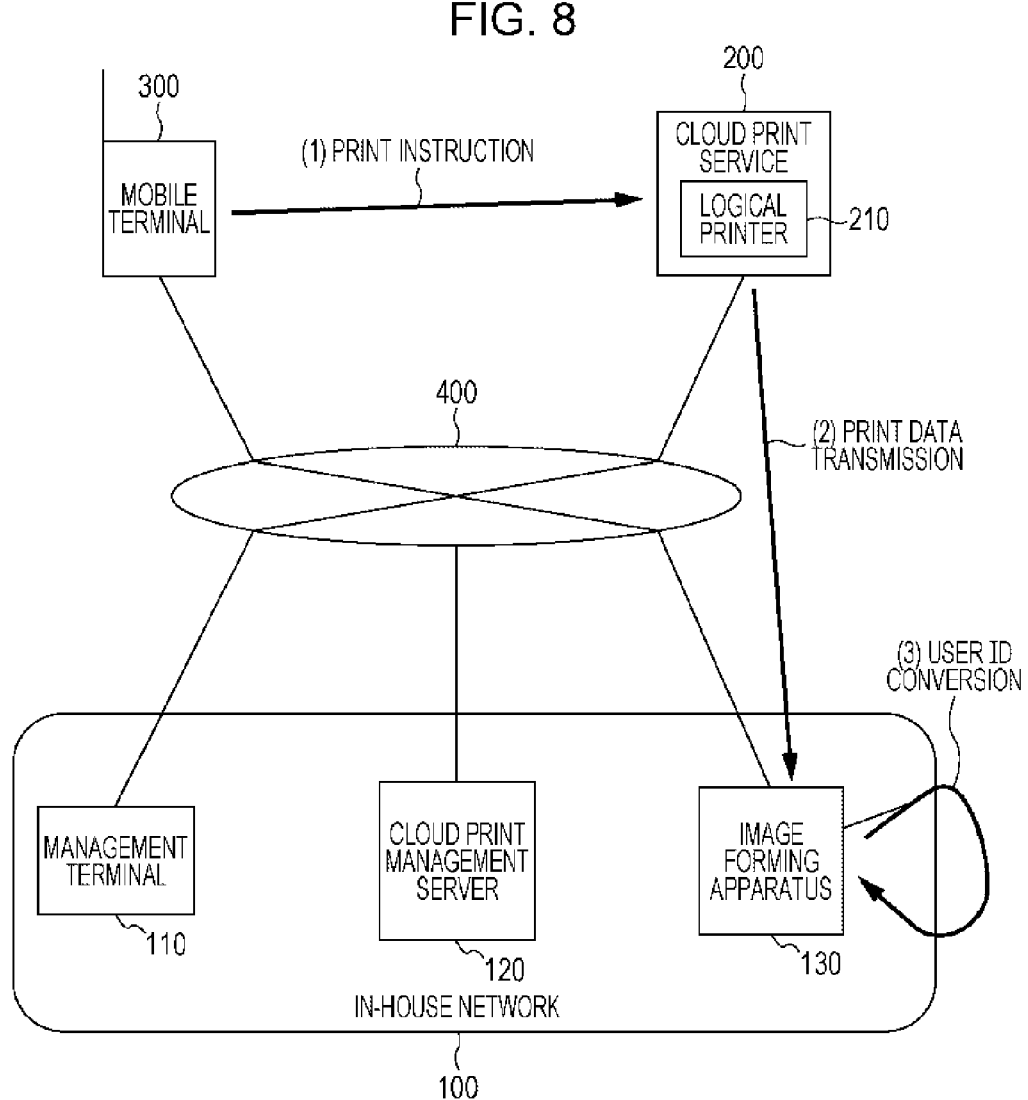

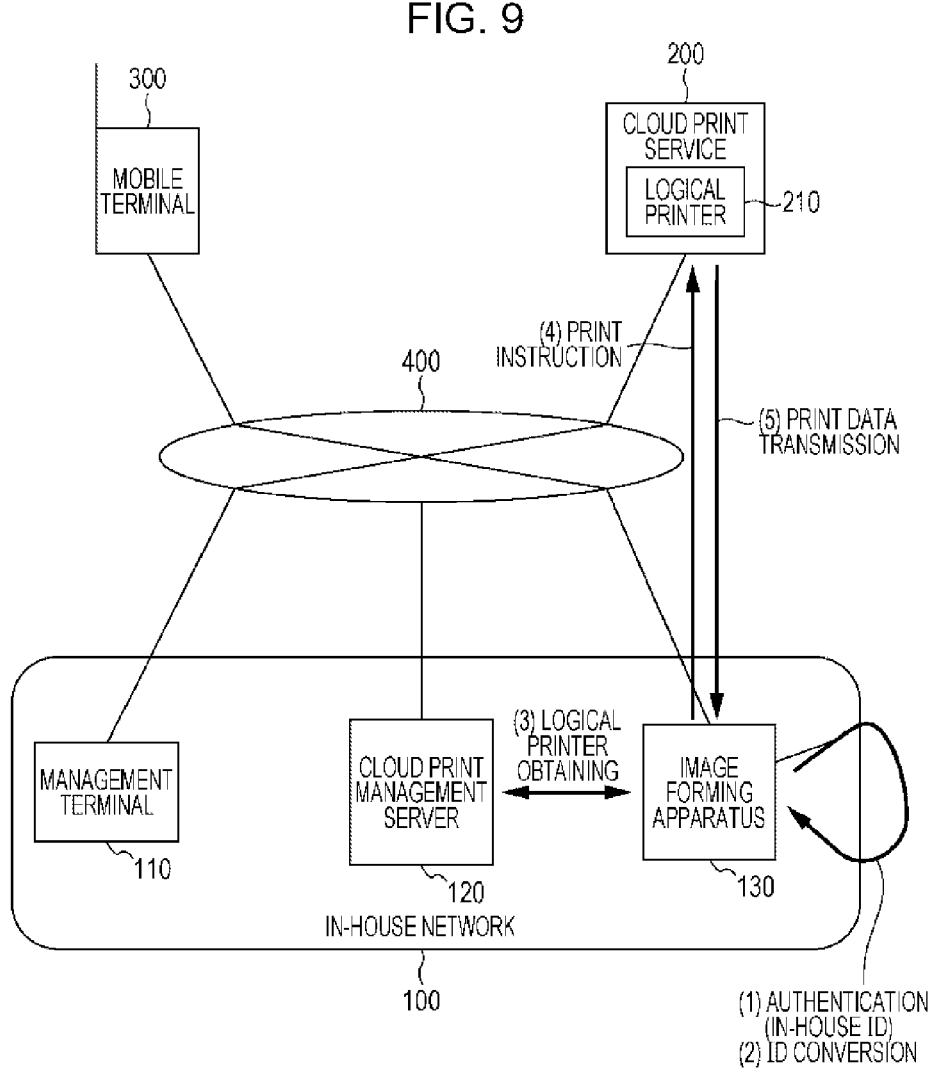

FIG. 10

| CLOUD USER ID | IN-HOUSE USER ID |
|---|---|
| tanaka@cloudprint.com | fx1234 |
| suzuki@cloudprint.com | fx9999 |
| Any | fx9999 |

FIG. 11

| CLOUD USER ID | IN-HOUSE USER ID |
|---|---|
| tanaka@cloudprint.com | fx1234 |
| suzuki@cloudprint.com | fx9999 |
| Any | Unknown |

FIG. 12

| CLOUD USER ID | SERVICE NAME | IN-HOUSE USER ID |
|---|---|---|
| tanaka@cloudprint.com | CloudPrint | fx1234 |
| suzuki@cloudprint.com | CloudPrint | fx9999 |
| tanaka@printservice.com | PrintService | fx1234 |

FIG. 13

| CLOUD USER ID | SERVICE NAME | IN-HOUSE USER ID |
|---|---|---|
| tanaka@cloudprint.com | CloudPrint | fx1234 |
| suzuki@cloudprint.com | CloudPrint | fx9999 |
| tanaka@printservice.com | PrintService | fx1234 |
| Any | CloudPrint | fx9999 |
| Any | PrintService | Unknown |

FIG. 15

| TEMPORARY ID | REGULAR LOCAL ID | EFFECTIVE PERIOD |
|---|---|---|
| fx50000 | fx23456 | 4/1/2013 10:00-17:00 |
| fx50001 | fx12345 | 4/1/2013 10:30-17:00 |
| ... | ... | ... |

FIG. 16

| GUEST INFORMATION MANAGEMENT ID | ISSUED ID (GUEST ID) | EFFECTIVE PERIOD | GUEST NAME | BELONG TO | DESTINATION OF VISIT | CLOUD ID |
|---|---|---|---|---|---|---|
| gt123456 | fx90001 | 4/1/2013 10:00-17:00 | SABURO SATO | XX COMPANY, X DIVISION | fx10002 | |
| gt123457 | fx90002 | 4/1/2013 10:00-17:00 | HANAKO SUZUKI | YY COMPANY, Y DIVISION | dv123 | suzuki52@cloudprint.com |
| gt123458 | fx90003 | 4/1/2013 10:00-17:00 | JIRO TANAKA | ZZ UNIVERSITY, Z DEPARTMENT | pr345 | tanaka321@cloudprint.com |
| ... | ... | ... | ... | ... | ... | ... |

FIG. 17A

| TIME AND DATE | TYPE OF PROCESSING | LOCAL ID | NUMBER OF PRINTS | ... | IMAGE LOG | CLOUD ID |
|---|---|---|---|---|---|---|
| 4/1/2013 10:25:20 | COPY | fx90001 | 20 | ... | 00123.jpg | — |
| 4/1/2013 10:27:03 | PRINT | fx90002 | 5 | ... | 00124.pdf | suzuki52@cloudprint.com |
| 4/1/2013 10:28:20 | PRINT | fx12345 | 30 | ... | 00125.jpg | efgbc@cloud |
| 4/1/2013 10:31:30 | PRINT | fx50000 (fx23456) | 10 | ... | 00126.jpg | abcde@cloud |
| ⋮ | | | | | | |

FIG. 17B

| TIME AND DATE | TYPE OF PROCESSING | LOCAL ID | NUMBER OF PRINTS | ... | IMAGE LOG | CLOUD ID | ID USER |
|---|---|---|---|---|---|---|---|
| 4/1/2013 10:25:20 | COPY | fx90001 | 20 | ... | 00123.jpg | — | gt123456 |
| 4/1/2013 10:27:03 | PRINT | fx90002 | 5 | ... | 00124.pdf | suzuki52@cloudprint.com | gt123457 |
| 4/1/2013 10:28:20 | PRINT | fx50001 | 30 | ... | 00125.jpg | efgbc@cloud | fx12345 |
| 4/1/2013 10:31:30 | COPY | fx50000 | 10 | ... | 00126.jpg | abcde@cloud | fx23456 |
| ⋮ | | | | | | | |

FIG. 18

| LOCAL ID | NAME | CONTACT | MEMBER DIVISION | MEMBER PROJECT | ......... |
|---|---|---|---|---|---|
| fx10001 | TARO TANAKA | tanaka@example... | dv101 | pr012, pr123 | ......... |
| fx10002 | REIICHI FUJI | fuji@example... | dv101 | pr345 | ......... |
| ⋮ | ⋮ | ⋮ | ⋮ | ⋮ | ⋮ |

FIG. 19

| DIVISION ID | NAME | CONTACT | ......... |
|---|---|---|---|
| dv101 | aaa DIVISION | aaa@example... | ......... |
| dv102 | bbb DIVISION | bbb@example... | ......... |
| ⋮ | ⋮ | ⋮ | ⋮ |

FIG. 20

| PROJECT ID | NAME | CONTACT | ......... |
|---|---|---|---|
| pr101 | ppp PROJECT | ppp@example... | |
| pr102 | qqq SEMINAR | qqq@example... | ......... |
| ⋮ | ⋮ | ⋮ | ⋮ |

FIG. 21

```
<PRINT TICKET>
    ....................
    ....................
    <TO-BE-BILLED DESTINATION> pr456 </TO-BE-BILLED DESTINATION>
</PRINT TICKET>
```

FIG. 22

| GUEST INFORMATION MANAGEMENT ID | ISSUED ID (GUEST ID) | ... | CLOUD ID | BILLING SYSTEM |
|---|---|---|---|---|
| gt123456 | fx90001 | ... | | CASH |
| ⋮ | ⋮ | ⋮ | ⋮ | ⋮ |
| gt125678 | fx93456 | ... | | CHANGE TO pr1234 |
| gt125679 | fx93457 | ... | ichida@cloudprint.com | CLOUD ACCOUNT |
| ⋮ | ⋮ | ⋮ | ⋮ | ⋮ |

FIG. 23

| TIME AND DATE | TYPE OF PROCESSING | LOCAL ID | NUMBER OF PRINTS | ... | TO-BE-BILLED DESTINATION | CLOUD ID | ID USER |
|---|---|---|---|---|---|---|---|
| 4/1/2013 10:25:20 | COPY | fx90001 | 20 | ... | CASH | — | gt123456 |
| 4/1/2013 10:27:03 | PRINT | fx90002 | 5 | ... | CREDIT | suzuki52@cloudprint.com | gt123457 |
| 4/1/2013 10:28:20 | PRINT | fx50001 | 30 | ... | dv123 | efgbc@cloud | fx12345 |
| ⋮ | | | | ... | | | |
| 4/1/2013 10:33:44 | COPY | fx93457 | 10 | ... | pr1234 | — | — |
| ⋮ | | | | ... | | | |

FIG. 24

| LOCAL ID | COLOR | DOUBLE-SIDED | MAXIMUM NUMBER OF PRINTS | | PRINT | COPY | FAX | SCAN |
|---|---|---|---|---|---|---|---|---|
| fx10001 | ✓ | ✓ | 324 | ...... | ✓ | ✓ | ✓ | ✓ |
| fx10002 | ✓ | ✓ | 220 | ...... | ✓ | ✓ | ✓ | ✓ |
| fx10003 | ✓ | ✓ | 12 | ...... | ✓ | ✓ | NA | ✓ |
| ... | ... | ... | ... | | ... | ... | ... | ... |
| (TEMPORARY) fx50001 – fx59999 | NA | NA | 100 | ...... | ✓ | ✓ | NA | ✓ |
| (GUEST) fx90001 – fx99999 | NA | NA | 30 | ...... | ✓ | ✓ | NA | NA |

IMAGE FORMING APPARATUS AND METHOD, NON-TRANSITORY COMPUTER READABLE MEDIUM, AND IMAGE FORMING SYSTEM

CROSS-REFERENCE TO RELATED APPLICATIONS

This application is based on and claims priority under 35 USC 119 from Japanese Patent Application No. 2013-145019 filed Jul. 10, 2013.

BACKGROUND (i) Technical Field

The present invention relates to an image forming apparatus and method, a non-transitory computer readable medium, and an image forming system.

(ii) Related Art

Existing print services are generally on-premises services installed at individual organizations (such as companies and schools). Because an on-premises print service (server) is a closed system for each organization, user identification information (ID) (such as an employee number) unique to that organization may be used as it is as a user account. Therefore, security printing and aggregation management of print jobs may be easily performed using user IDs unique to each organization.

In contrast, cloud print services provided on the Internet, such as Google Cloud Print developed by Google, have been proposed in recent years. A user at a personal computer (PC) or the like logs in to a cloud print service with a user ID for that service, and, after the user logs in, the user sends print data to the cloud print service. The print data is printed by providing the print data from the cloud print service to an image forming apparatus via the Internet or the like.

Unlike on-premises services, cloud print services are shared among plural organizations or individuals, and each cloud print service allocates user IDs independent of the individual organizations. Because users may not be able to obtain, as their user IDs for the cloud print services, the same user IDs as those in their organizations, user IDs used for user authentication in the cloud print services do not generally coincide with user IDs that are given in and unique to the individual organizations. A cloud print service knows a user ID for that service with regard to print data, but does not know a user ID unique to each organization. Therefore, when print data is provided from a cloud print service to an image forming apparatus and is printed with the image forming apparatus, the image forming apparatus is unable to apply security printing or aggregation management regarding that print data on the basis of the user ID unique to the organization.

SUMMARY

According to an aspect of the invention, there is provided an image forming apparatus that performs printing processing using first identification information that is information for identifying, in a first system in a particular organization that performs first authentication, a user in the first authentication. The image forming apparatus includes an obtaining unit, a reference unit, and a controller. The obtaining unit obtains print data from a logical printer in a second system that is a cloud service system that performs second authentication. Information for identifying a user in the second system is second identification information, and the print data includes the second identification information. The reference unit refers to relationship information between the first identification information and the second identification information in a case where the obtained print data includes the second identification information. The controller controls printing processing of the print data obtained by the obtaining unit using the first identification information obtained by a reference made by the reference unit. Identification information of the user, which is temporarily issued in the first system, is used as the first identification information.

BRIEF DESCRIPTION OF THE DRAWINGS

An exemplary embodiment of the present invention will be described in detail based on the following figures, wherein:

FIG. 8 is a diagram for describing an example of the flow of printing processing in the system according to the exemplary embodiment;

FIG. 9 is a diagram for describing another example of the flow of printing processing in the system according to the exemplary embodiment;

FIG. 10 is a diagram illustrating an example of a conversion table in which an in-house ID for an unknown account is prepared;

FIG. 11 is a diagram illustrating another example of a conversion table in which an in-house ID for an unknown account is prepared;

FIG. 12 is a diagram illustrating an example of a conversion table corresponding to multiple cloud print services;

FIG. 13 is a diagram illustrating an example of a conversion table in which an in-house ID for an unknown account is prepared, and which corresponds to multiple cloud print services;

FIG. 15 is a diagram illustrating an example of temporary ID management information;

FIG. 16 is a diagram illustrating an example of guest ID management information;

FIGS. 17A and 17B are diagrams illustrating examples of log information of processing recorded by the image forming apparatus and an aggregation apparatus in the system using a temporary local ID (in-house ID);

FIG. 18 is a diagram illustrating an example of user management information;

FIG. 19 is a diagram illustrating an example of division management information;

FIG. 20 is a diagram illustrating an example of project management information;

FIG. 21 is a diagram conceptually illustrating a print ticket including, in addition to a local ID, a uniquely defined element representing a to-be-billed destination;

FIG. 22 is a diagram illustrating an example of guest ID management information including information on a billing method;

FIG. 23 is a diagram illustrating an example of log information including information on a to-be-billed destination, recorded by the image forming apparatus;

FIG. 24 is a diagram illustrating an example of use authority information representing the use authority of each user;

DETAILED DESCRIPTION

Figure 1:
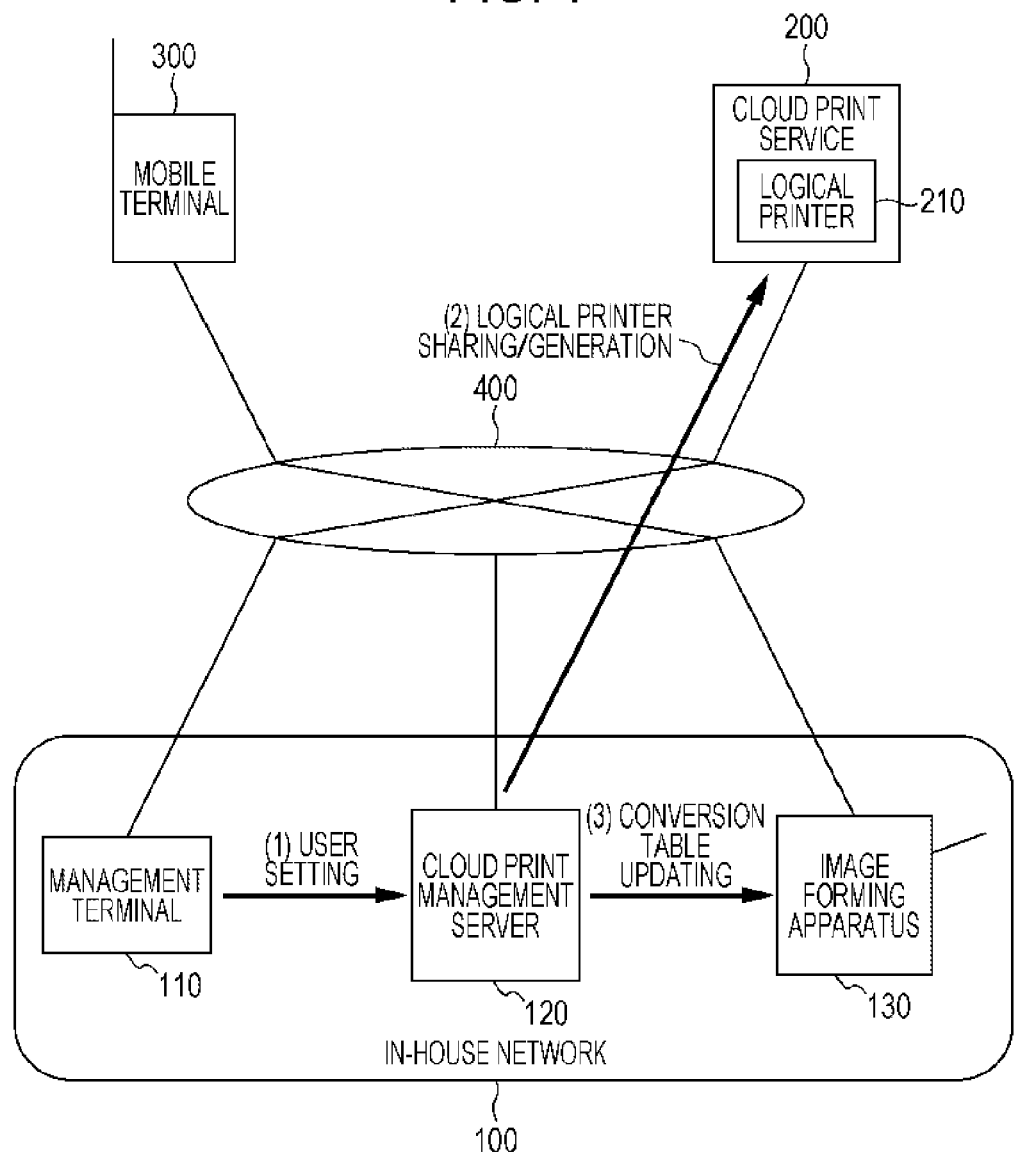
FIG. 1 is a diagram for describing an example of the configuration of a system according to an exemplary embodiment and the flow of user setting in the system.

Referring to FIG. 1, an example of the configuration of a system according to an exemplary embodiment will be described. The system described by way of example includes a management terminal 110, a cloud print management server 120, and an image forming apparatus 130 that are connected to an in-house network 100 in a certain company, a cloud print service 200, and a mobile terminal 300. The in-house network 100 is configured as, for example, a local area network (LAN). The in-house network 100, the cloud print service 200, and the mobile terminal 300 are capable of connecting to the Internet 400.

The company described by way of example here is an example of an "organization" including plural users. The management terminal 110, the cloud print management server 120, and an information processing apparatus group of image forming apparatuses 130 constitute an internal information system in that "organization". For example, the internal information system in the organization may include, besides the management terminal 110, the cloud print management server 120, and the image forming apparatus 130 illustrated in FIG. 1, an aggregation apparatus that aggregates print fees for each user and each section in the entirety of the in-house network 100 including multiple image forming apparatuses 130.

The management terminal 110 is an information processing apparatus used by a particular administrator who is in charge of system management regarding the use of at least the cloud print service 200, and is a PC, for example. The administrator accesses the cloud print management server 120 from the management terminal 110, and performs user setting for using the cloud print service 200. In the case where the cloud print management server 120 provides to the management terminal 110 an input screen for user setting in the form of a web page, it is only necessary for the management terminal 110 to have a web browser.

The cloud print management server 120 is a server that performs processing for user setting for using the cloud print service 200. The cloud print management server 120 will be described in detail later with reference to FIG. 2.

Each of the image forming apparatuses 130 is an apparatus that prints, on a sheet, print data input thereto. The image forming apparatus 130 may include functions in addition to a print function. For example, the image forming apparatus 130 may be a so-called digital multifunctional apparatus including, in addition to the print function, a scan function, a copy function, a facsimile sending function, and an email sending function. Although only one image forming apparatus 130 is illustrated in FIG. 1, multiple image forming apparatuses 130 may be connected to the in-house network 100. Besides the function of executing a process such as copying, scanning, or printing in response to an instruction from a user, which is accepted by a user interface (UI) unit of the image forming apparatus 130, the image forming apparatus 130 has the function of executing a process such as printing in response to an instruction from a computer in the in-house network 100. Also, the image forming apparatus 130 has the function of obtaining print data from the cloud print service 200 on the Internet 400 and printing and outputting the print data.

Each user (individual in this case) who belongs to the company is allocated a user ID unique in the company (that is, exclusive within the company) (hereinafter referred to as an "in-house ID"). For example, an employee number is an example of such a user ID. Each information processing apparatus (such as the image forming apparatus 130, the aggregation apparatus, and the like) on the in-house network 100 authenticates and manages a user using this in-house ID. For example, the image forming apparatus 130 has the function of performing user authentication using an in-house ID. A user who wants to use the image forming apparatus 130 is asked to present authentication information (such as inputting the in-house ID and password from the UI unit, or integrated circuit (IC) card authentication). The image forming apparatus 130 performs user authentication in accordance with the presentation, thereby specifying the in-house ID of that user. The image forming apparatus 130 incorporates the specified in-house ID in log information or the like of an executed process, and records the log information therein or in the aggregation apparatus (not illustrated) in the in-house network 100. The recorded log information may be aggregated by the aggregation apparatus for management of the usage of the image forming apparatus 130 or for accounting management in the company. Aggregation is performed for, for example, each user or for each section (department or group in the company) to which the user belongs, on the basis of the in-house ID recorded in each piece of log information.

The cloud print service 200 is a system that provides a print service to a user on a network such as the Internet 400. Although the cloud print service 200 is generally a system including plural computers, the cloud print service 200 may be constituted of a single computer. For example, Google Cloud Print is an example of the cloud print service 200.

The cloud print service 200 provides users with the function of converting, for example, document data (such as document data generated by software such as a word-processing or spreadsheet program) specified by a user to be printed to data in a data format that the image forming apparatus 130 is capable of handling (such as Portable Document Format (PDF) or PostScript (registered trademark)), the function of generating a print job corresponding to the accepted print instruction and managing the execution status of that print job (such as queue management), and the like. The cloud print service 200 generates and manages a logical printer 210 (may also be referred to as a "printer object") that realizes various functions for print services. In the logical printer 210, at least one user who uses the logical printer 210 is registered. In general, plural logical printers 210 are held in the cloud print service 200, and each logical printer 210 is used by at least one user who is registered therein.

In addition, at least one physical image forming apparatus 130, which outputs a print job held in a queue in the logical printer 210, may be registered in the logical printer 210. In this case, the logical printer 210 holds various types of management information regarding the registered image forming apparatus 130. The management information includes, for example, identification information (such as a printer name) of the image forming apparatus 130, and capability information that indicates the capability (functions) of the image forming apparatus 130. The capability information includes information indicating, for example, whether the image forming apparatus 130 is capable of performing duplex printing or full-color printing, and the like. When the image forming apparatus 130 has a post-processing device, the capability information further includes information regarding the capability of the post-processing device (such as stapling, punching, and folding functions).

A user registers (generates) the user's account in the cloud print service 200. When generating the account, the user registers a user ID (hereinafter referred to as a "cloud ID") that is unique in the cloud print service 200. The cloud print service 200 is a public service, and management of user IDs in the cloud print service 200 is independent of user management in the in-house network 100 of the company. Thus, the cloud ID is generally not the same as the in-house ID. For example, when a user in the company tries to register a user ID including the same character string as that of the in-house ID in the cloud print service 200, the user may not be able to register that user ID because, for example, that user ID has already been allocated to another person. In this manner, the in-house network 100 and the cloud print service 200 (or a larger cloud service system including the service 200) perform user authentication and management using user IDs that are different from each other.

In response to an instruction from a user, the cloud print service 200 generates a logical printer 210 for that user. In addition, in response to an instruction to an existing logical printer 210 from a user who has the right to be registered as a sharing user, the cloud print service 200 registers this user or another user in the existing logical printer 210. For each logical printer 210, the cloud print service 200 stores the cloud ID of each user who shares that logical printer 210.

A user logs in with the user's cloud ID to the cloud print service 200 via the Internet 400 by using a communication protocol such as the Hypertext Transfer Protocol (HTTP) from a PC or the mobile terminal 300, and the user gives a print instruction to a logical printer 210 selected from among one or more logical printers 210 (there may be plural logical printers 210) associated with that cloud ID. The print instruction includes document data to be printed, or information that specifies a target to be printed, such as information that specifies document data to be printed (such as information of the storage location of the document data on the Internet 400 (such as a uniform resource locator (URL))). In response to the print instruction, the logical printer 210 generates a print job and manages the print job. The print job is a unit for managing the print instruction in the logical printer 210, and the print job is given a unique job ID. In association with the job ID, the logical printer 210 manages information such as information of the document data to be printed, page description language data obtained by converting the document data, the cloud ID of the user who has given the print instruction, and the execution status (such as unexecuted, being executed, execution completed, or error) of the print job.

The logical printer 210 sends the held print job to an image forming apparatus 130 specified by the user and causes that image forming apparatus 130 to print the print job (push method), or, in response to an obtaining request from an image forming apparatus 130, provides the print job to that the image forming apparatus 130 (pull method). For example, when an image forming apparatus 130 is behind a firewall, printing is performed using the pull method in which the image forming apparatus 130 accesses the cloud print service 200 using a protocol such as HTTP and obtains a print job.

The mobile terminal 300 is a mobile information terminal such as a notebook or tablet PC, a mobile phone, or a smart phone, and has the function of connecting to the Internet 400. A user logs in from the mobile terminal 300 to the cloud print service 200 and gives various instructions to the service 200.

Next, referring to FIGS. 1 and 2, the cloud print management server 120 will be described in detail.

The cloud print management server 120 accepts, from the administrator who operates the management terminal 110, a setting instruction for performing printing, by a user in the company, with the image forming apparatus 130 in the in-house network 100 via the cloud print service 200 ("(1) user setting" in FIG. 1). This user setting instruction includes the in-house ID and the cloud ID of the user, and identification information of the logical printer 210 used by the user (hereinafter referred to as a "logical printer ID"). These IDs are presented by, for example, the user to the administrator, and the administrator inputs a set of these IDs from the management terminal 110 to the cloud print management server 120. The logical printer ID specified here may be an ID uniquely given by the cloud print service 200 to the logical printer 210, or may be the name of the logical printer 210 named by the user (this name may not necessarily be unique in the cloud print service 200). In the latter case, the cloud print management server 120 may manage the corresponding relationship between the logical printer ID named by the user and the unique ID given by the cloud print service 200 to the logical printer 210, and may convert the logical printer ID specified by the user to the unique ID in the cloud print service 200. Alternatively, the cloud print service 200 may manage the corresponding relationship between the logical printer ID named by the user and the unique ID given by the user to the logical printer 210.

Such a user setting instruction is accepted by a user setting accepting unit 122 in the cloud print management server 120. In response to the user setting instruction, a cloud interface (IF) unit 124 and a corresponding relationship notifying unit 126 execute setting processing in the cloud print service 200 and each image forming apparatus 130 in the in-house network 100.

That is, using the cloud ID and the logical printer ID included in the user setting instruction, the cloud IF unit 124 performs setting processing in the cloud print service 200 for enabling the user to use the logical printer 210 corresponding to the logical printer ID ("(2) logical printer sharing/generation" in FIG. 1). In this setting processing, the cloud IF unit 124 determines whether the logical printer 210 which has the logical printer ID is registered in the cloud print service 200. This determination may be performed by, for example, determining whether the logical printer ID included in the user setting instruction is included in a list of logical printer IDs stored in the cloud IF unit 124 (for example, see FIG. 3). Alternatively, this determination may be performed by asking the cloud print service 200.

If the result of the determination indicates that the logical printer 210 corresponding to the logical printer ID included in the user setting instruction is registered in the cloud print service 200, the cloud IF unit 124 sends to the cloud print service 200 an instruction to add this cloud ID to a list of sharers of the logical printer 210. On the contrary, if the corresponding logical printer 210 is not registered in the cloud print service 200, the cloud IF unit 124 sends to the cloud print service 200 an instruction to generate a logical printer 210 corresponding to the logical printer ID and an instruction to add this cloud ID to a list of sharers of the generated logical printer 210.

For these various types of instructions to the cloud print service 200, in one example, the cloud print management server 120 itself (or the administrator) has an account (in-cloud ID) in the cloud print service 200. That is, in this example, the cloud print management server 120 logs in to the cloud print service 200 using its account, generates a new logical printer 210 for the user in the company and registers the user as a sharer of the logical printer 210, or registers the user in the company as a sharer of an existing logical printer 210. Since the cloud print service 200 has an access right for changing every setting of a logical printer 210 generated by the cloud print service 200, it is only necessary for the cloud print service 200 to use this access right and to perform a sharer setting. Note that it is only necessary for the user in the company who is to be set as a sharer to be permitted to exercise an access right to input a print instruction (job) to the logical printer 210 and to execute the print job in the logical printer 210 (that is, to provide a print job to the image forming apparatus 130 and to print the print job). Therefore, the cloud print management server 120 (cloud IF unit 124) may perform a setting to exclude the right to set a sharer, for example, from the access right of a sharer set to the logical printer 210.

The above description is about user setting in the cloud print service 200.

Meanwhile, the corresponding relationship notifying unit 126 notifies each image forming apparatus 130 in the in-house network 100 of the cloud ID and the in-house ID included in the user setting instruction, thereby updating a table for cloud ID/in-house ID conversion held by each image forming apparatus 130 ("(3) conversion table updating" in FIG. 1).

Figures 6, 7:
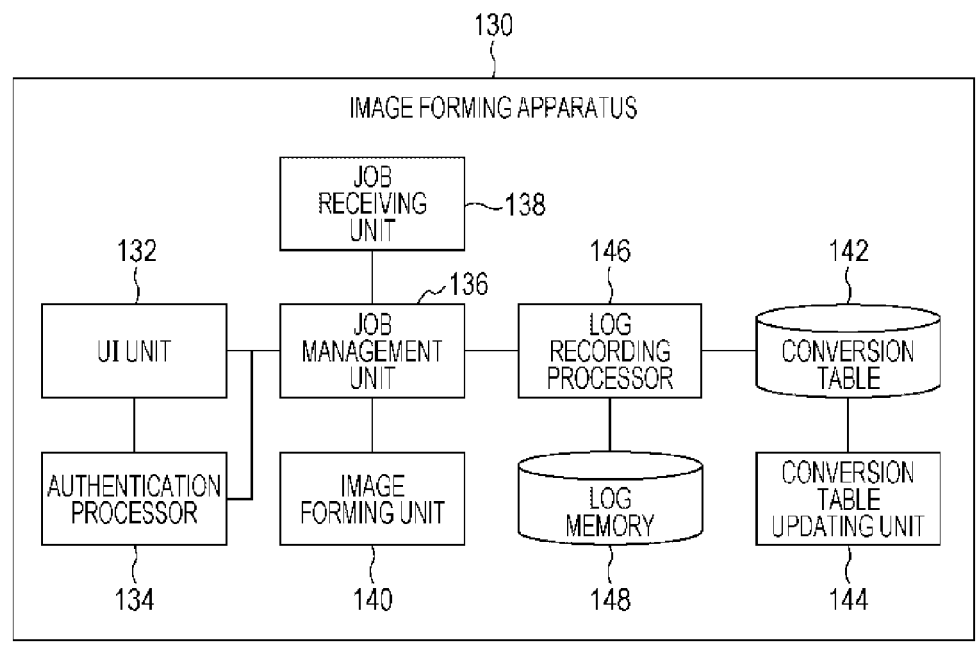
FIG. 6 is a diagram illustrating an example of the configuration of the image forming apparatus.
FIG. 7 is a diagram illustrating a state in which a sharer is added to an existing logical printer by additionally giving yet another user setting instruction to the setting information illustrated in FIG. 3.

Each image forming apparatus 130 in the in-house network 100 has a conversion table 142, as illustrated in FIG. 6. The conversion table 142 is a table for holding, for each user, the cloud ID and in-house ID of the user. The image forming apparatus 130 has the function of converting a cloud ID to an in-house ID by referring to the conversion table 142. In the image forming apparatus 130, which has been notified of a pair of the cloud ID and the in-house ID by the corresponding relationship notifying unit 126 of the cloud print management server 120, a conversion table updating unit 144 adds the pair to the conversion table 142, thereby updating the conversion table 142.

Figures 2, 3, 4, 5:
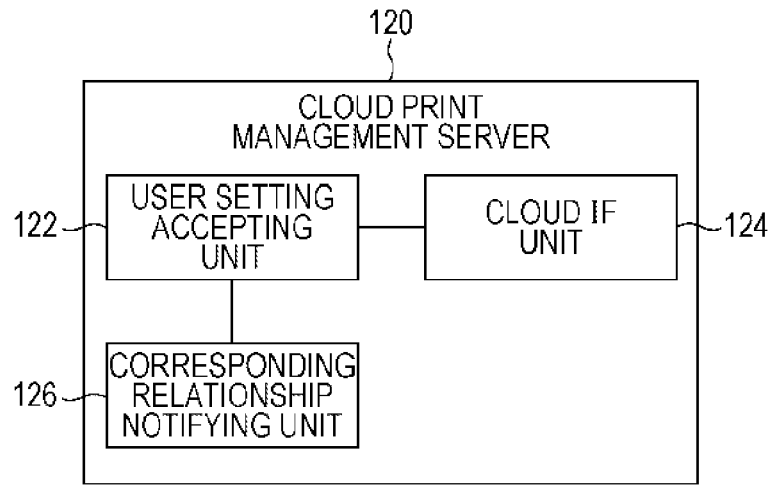
FIG. 2 is a diagram illustrating an example of the configuration of a cloud print management server.
FIG. 3 is a diagram illustrating an example of setting information held in the cloud print management server.
FIG. 4 is a diagram illustrating an example of information on a sharer(s) of each logical printer managed by a cloud print service.
FIG. 5 is a diagram illustrating an example of a conversion table held by an image forming apparatus.

Note that, as illustrated by way of example in FIG. 3, the cloud print management server 120 may store a set of a logical printer ID, a cloud ID, and an in-house ID included in each user setting instruction received from the management terminal 110 as a table. In the example illustrated in FIG. 3, for the logical printer "Printer-A", a first user who has the cloud ID "tanaka@cloudprint.com" and the in-house ID "fx1234", and a second user who has the cloud ID "suzuki@cloudprint.com" and the in-house ID "fx9999" are registered as sharers; and for the logical printer "Printer-B", the first user is registered as a sharer. In this case, as illustrated in FIG. 4, the cloud print service 200 holds information of a portion including logical printer IDs and cloud IDs in the table illustrated in FIG. 3, and controls access to each logical printer 210 by a user in accordance with this information. In addition in this case, the conversion table 142 held by each image forming apparatus 130 represents, as illustrated in FIG. 5, information of a portion including cloud IDs and in-house IDs in the table illustrated in FIG. 3.

Note that the character string "cloudprint.com" included in cloud IDs in FIG. 3 and the like is the domain name of the cloud print service 200.

It is assumed that the administrator inputs from the management terminal 110 to the cloud print management server 120 an instruction to newly set a third user who has the cloud ID "sato@cloudprint.com" and the in-house ID "fx2345" in the logical printer "Printer-A" in the system (the cloud print management server 120, the cloud print service 200, and each image forming apparatus 130) in which user information is in states illustrated in FIGS. 3 to 5. In this case, information held by the cloud print management server 120 enters a state illustrated in FIG. 7, and accordingly, the cloud ID "sato@cloudprint.com" is added as a sharer of the logical printer "Printer-A" to the cloud print service 200, and information indicating that the cloud ID "sato@cloudprint.com" and the in-house ID "fx2345" correspond to each other is added to the conversion table 142 in each image forming apparatus 130.

In addition, it is assumed that the administrator inputs an instruction to newly add the above-mentioned second user, who has the cloud ID "suzuki@cloudprint.com" and the in-house ID "fx9999", to the logical printer "Printer-C" to the system in which the user information is in the states illustrated in FIGS. 3 to 5. In this case, since a logical printer 210 corresponding to the logical printer ID "Printer-C" is not in the cloud print service 200, a new logical printer 210 is generated in response to an instruction from the cloud IF unit 124. The cloud ID "suzuki@cloudprint.com" of the second user is set as a sharer of the generated logical printer 210 with the logical printer ID "Printer-C". Meanwhile, since the second user's information is already registered in the conversion table 142 in each image forming apparatus 130 in the state illustrated in FIG. 3, there is no change to the conversion table 142.

In the exemplary embodiment as has been described above, in response to a user setting instruction given by the administrator to the management terminal 110, the corresponding relationship between a cloud ID and an in-house ID is registered in each image forming apparatus 130, and setting for enabling the user to use a specified logical printer 210 is automatically performed in the cloud print service 200.

Next, referring to FIG. 6, an example of the configuration of one image forming apparatus 130 in the in-house network 100 will be described. Since the conversion table 142 and the conversion table updating unit 144 have already been described among elements of the image forming apparatus 130 illustrated in FIG. 6, the remaining elements will be described.

A user interface (UI) unit 132 is a mechanism for accepting a local operation from a user (such as a direct operation entered by a hand or the like). For example, the UI unit 132 includes input and display hardware such as a touch panel and mechanical buttons. The UI unit 132 exchanges information with a user via the hardware.

An authentication processor 134 performs a process for authenticating a user who locally uses the image forming apparatus 130. The user authentication is performed using an in-house ID instead of a cloud ID. A known method may be used as a method of inputting authentication information to the authentication processor 134. For example, there are various methods, such as the method of inputting an in-house ID and password to the UI unit 132, or the method of performing authentication by communicating with an IC card-type ID card (that stores information of an in-house ID) of a user by using an IC card reader attached to the image forming apparatus 130. When the user authentication performed by the authentication processor 134 is successful, the in-house ID of the user who is operating the image forming apparatus 130 is specified. Alternatively, instead of the authentication processor 134 performing user authentication, the authentication processor 134 may request an authentication server in the in-house network 100 to perform user authentication.

A job management unit 136 generates a job in response to a local processing instruction from the UI unit 132 to the image forming apparatus 130 or a processing instruction from a remote apparatus via a network, and manages execution of the job.

The user who has been authenticated is enabled to give various processing instructions, such as copying and scanning instructions, from the UI unit 132. In response to such a processing instruction, the job management unit 136 generates a job for managing the processing, and performs job management such as queue management. The job management unit 136 controls each device of the image forming apparatus 130 to execute the job. For example, upon receipt of a copying instruction, a scanner in the image forming apparatus 130 is activated to read a document, and an image forming unit 140 prints, on a sheet, an image obtained as a result of reading the document.

In addition, the job management unit 136 receives, at a job receiving unit 138, print data from another apparatus (including the cloud print service 200 on the Internet 400) via the in-house network 100, and generates and manages a job corresponding to the print data. When that job becomes the top item in the execution order, the job management unit 136 causes the image forming unit 140 to print the print data of the job on a sheet.

A log recording processor 146 records, in a log memory 148, processing log information of each job executed under management of the job management unit 136. The recorded log information includes information of the in-house ID of a user who has given an instruction to execute the job. The log information further includes information of various items that are generally recorded in the field of processing log management of image forming apparatuses, such as the job execution time and date, print setting information in the case of printing (duplex printing or not, color printing or monochrome printing, etc.), and the number of prints made. The log information of each job, which is stored in the log memory 148, is used for aggregation of the amount of usage of the image forming apparatus 130 by each section or each user in the company or the fees for each section or each user in the company. The aggregation is performed by the aggregation apparatus (not illustrated) in the in-house network 100. In the aggregation, for each piece of log information stored in the log memory 148, a user who has executed a job regarding the log information and, as occasion calls, a section to which the user belongs are specified on the basis of the in-house ID included in the log information. The amount of usage, such as the number of prints made in the job (or the fees in accordance with the amount of usage), is added to the aggregated value of the amount of usage (fees) of the specified user and section.

In the log memory 148, the in-house ID in the job is recorded as an ID for specifying the user who has given the job instruction. Accordingly, the amount of usage (fees) may be aggregated for each user or for each section by referring to in-house organization information.

Here, in the case of a local processing instruction or a processing instruction from another apparatus in the in-house network 100, information of the processing instruction includes the in-house ID of a user who has given the instruction. Thus, the log recording processor 146 may only need to incorporate that in-house ID in the log information and to record the log information.

In contrast, print data provided from the logical printer 210 in the cloud print service 200 to the image forming apparatus 130 includes the cloud ID of a user who has given an instruction to print print data, but does not include that user's in-house ID, because the cloud print service 200 does not know the in-house ID. Although it may not be totally impossible to alter the cloud print service 200 so that the cloud print service 200 becomes capable of managing user IDs in other systems, such as individual in-house systems, besides user IDs (cloud IDs) for user management by the cloud print service 200, this is generally unexpectable.

Therefore, in the case where a user ID included in a job (print job or the like) is a cloud ID, the log recording processor 146 refers to the conversion table 142 and converts the cloud ID to an in-house ID. For example, in the case where a user ID included in a job is not an in-house ID, the log recording processor 146 compares this user ID with a group of pairs of a cloud ID and an in-house ID registered in the conversion table 142, and, if the user ID matches a cloud ID included in one of the pairs, converts the cloud ID to an in-house ID included in that pair. The log recording processor 146 incorporates the conversion result in log information, and records the log information in the log memory 148.

In the example illustrated in FIG. 6, the log memory 148 is provided in the image forming apparatus 130. Alternatively, the log memory 148 may be provided in another apparatus (such as the aggregation apparatus) in the in-house network 100, and the log recording processor 146 may write log information in that apparatus.

So far, the flow of user setting to the cloud print management server 120 and each image forming apparatus 130 via the cloud print management server 120 in this system and examples of the configuration of the cloud print management server 120 and the image forming apparatus 130 have been described. Next, referring to FIGS. 8 and 9, an example of the flow of printing processing using the cloud print service 200 in this system will be described.

FIG. 8 illustrates the flow of a process in the case where a computer (for example, the mobile terminal 300 is illustrated in the example illustrated in FIG. 8) on the Internet 400 gives a print instruction to the cloud print service 200.

In this example, (1) a user who belongs to a company according to the in-house network 100 logs in to the cloud print service 200 via the Internet 400 from the mobile terminal 300 using the user's cloud ID, password, and the like, and gives a print instruction to the cloud print service 200. In this process, for example, when the user logs in to the cloud print service 200, a list of logical printers 210 corresponding to the user's cloud ID is provided to the mobile terminal 300, and the user selects a logical printer 210 that the user wants to use from the list. The user gives a print instruction including document data to be printed (or information that specifies the document data) to the selected logical printer 210. The print instruction also includes the ID of any of image forming apparatuses 130 in the in-house network 100 as information that specifies a (physical) printer at an output destination.

The logical printer 210, which has received this print instruction, converts the specified document data to print data in a page description language. (2) The logical printer 210 sends the print data to the image forming apparatus 130 specified as the output destination. Here, in the case where a firewall of the in-house network 100 is set to allow print data from the outside to pass, it is only necessary for the logical printer 210 to simply send the print data to the image forming apparatus 130. Meanwhile, in the case where the firewall is set not to allow the print data to pass, in one example, the logical printer 210 sends a message indicating that the print data is ready to the image forming apparatus 130 at the output destination by using a protocol capable of passing the firewall, and the image forming apparatus 130, which has received the message, accesses the logical printer 210 using a protocol capable of passing the firewall, such as HTTP, and obtains the print data. In another example, the image forming apparatus 130 may periodically access the logical printer 210 by using a protocol such as HTTP (polling), and may obtain document data if there is any document data addressed to the image forming apparatus 130. The print data sent from the logical printer 210 to the image forming apparatus 130 includes the cloud ID of the user who has given an instruction to print the print data (alternatively, the cloud ID is provided in association with the print data from the logical printer 210 to the image forming apparatus 130).

The image forming apparatus 130, which has received the print data from the logical printer 210, prints the print data on a sheet(s). (3) At this time, the image forming apparatus 130 converts the cloud ID included in the print data to an in-house ID by referring to the conversion table 142. In job management from this point onward, the in-house ID obtained as a result of conversion is used as the user ID. For example, the in-house ID is recorded as the user ID in log information recorded as a processing log of that job.

In another example, security printing may be realized using the in-house ID obtained as a result of conversion. In a security printing method, the image forming apparatus 130 does not promptly print received print data, but saves the received print data in a built-in memory device. At this time, the saved print data is associated with the in-house ID obtained by converting the cloud ID. If the user who has given the print instruction comes to the image forming apparatus 130 later and performs user authentication using the in-house ID at the authentication processor 134, the job management unit 136 prints the print data (job) which is associated with the in-house ID and saved in the memory device.

FIG. 9 illustrates the flow of a process in the case where a user gives a print instruction from one image forming apparatus 130 in the in-house network 100 to the cloud print service 200. In this example, (1) firstly the user logs in to the image forming apparatus 130 as a result of IC card authentication or the like. (2) Then, a controller in the image forming apparatus 130 converts an in-house ID specified by authentication at the time the user has logged in into a cloud ID by referring to the conversion table 142. (3) The controller in the image forming apparatus 130 obtains a logical printer ID corresponding to the cloud ID from the cloud print management server 120. In processing in (3), the cloud print management server 120 searches a management table of the corresponding relationship among a logical printer ID, a cloud ID, and an in-house ID, such as that illustrated by way of example in FIG. 3, for a logical printer ID corresponding to the cloud ID presented by the image forming apparatus 130, and returns a list of corresponding logical printer IDs to the image forming apparatus 130. For example, in the case where a user with the in-house ID "fx1234" logs in to the image forming apparatus 130 in the example illustrated in FIG. 3, the cloud print management server 120 provides the logical printer IDs "Printer-A" and "Printer-B" corresponding to that to the image forming apparatus 130.

Instead of obtaining a list of logical printers 210 corresponding to the user from the cloud print management server 120 as in processing in (3), the image forming apparatus 130 may send the user's cloud ID to the cloud print service 200 and directly obtain a list of logical printers 210 corresponding to the user from the cloud print service 200. If processing (3) is adopted, a list of logical printers 210 that are opened (for the company, so to speak) via the cloud print management server 120 is obtained. There are cases in which the user opens a personal logical printer 210 in the cloud print service 200 from a PC at home or the like, besides logical printers 210 that are opened for the company via the cloud print management server 120. According to processing (3), the possibility of printing a print job of such a personal logical printer 210 from the image forming apparatus 130 in the in-house network 100 is reduced.

In one example, the image forming apparatus 130 displays the presented list of logical printer IDs on a display screen of the UI unit 132. Here, the displayed logical printer IDs may be unique IDs given by the cloud print service 200. By using logical printer names named by the user at the time of user setting as the logical printer IDs, the logical printer IDs become more recognizable for the user. The UI unit 132 accepts selection by the user of a logical printer ID from the displayed list. (4) The image forming apparatus 130 accesses the cloud print service 200 using a protocol such as HTTP, and logs in to the cloud print service 200 using the user's cloud ID. By sending the selected logical printer ID to the cloud print service 200, the image forming apparatus 130 gives a print instruction to a logical printer 210 corresponding to the logical printer ID. The cloud print service 200, which has received the print instruction, provides a list of print jobs held in a queue in the logical printer 210 to the image forming apparatus 130. This list is displayed on the display screen of the UI unit 132, and the user selects a print job to be printed and output this time from the list. Then, the image forming apparatus 130 requests the specified print job from the logical printer 210 using HTTP or the like. (5) As a response in response to this request, the logical printer 210 sends print data of the requested print job to the image forming apparatus 130. The image forming apparatus 130 prints the obtained print data. In this printing processing, log recording, and the like, the image forming apparatus 130 manages the print data (job) in association with the in-house ID obtained by ID conversion (2).

Instead of asking the user to select a logical printer ID from the list of logical printer IDs, which is obtained in processing (3), a list of print jobs in all logical printers 210 included in that list may be obtained, and the user may be asked to select a print job to be printed from this list.

The above example regarding FIG. 9 is an example in the case where a print job that has already been held in the specified logical printer 210 is selected and printed from the image forming apparatus 130. In another example, the image forming apparatus 130 may give an instruction to a logical printer 210 in the cloud print service 200 to print document data saved in an online storage service (such as Google Docs (registered trademark) or Dropbox (registered trademark)) on the Internet 400. In this example, the image forming apparatus 130 displays a list of available online storages on the display screen of the UI unit 132, accepts selection of an online storage that the user wants to use, and accesses the selected online storage. The image forming apparatus 130 receives authentication information (user ID or the like) for the online storage, which is input from the user, sends the authentication information to the online storage, and receives user authentication using the authentication information. If it is possible to access the online storage using the same user ID (cloud ID) as that in the cloud print service 200, inputting of the user ID may be omitted. Alternatively, an online storage user ID may additionally be registered in the conversion table 142, and the image forming apparatus 130 may obtain an online storage user ID corresponding to an employee ID specified by user authentication from the conversion table 142, and may log in to the online storage using the user ID. By additionally inputting, by the administrator, the user's online storage user ID at the time of user authentication, it is only necessary to register that the user ID be registered in the conversion table 142 via the cloud print management server 120.

After the login, the online storage returns a list of document data saved by the user to the image forming apparatus 130. This list is displayed on the display screen of the UI unit 132, and the user selects a document to be printed from the list. The image forming apparatus 130 notifies the online storage of the selection result, along with information that specifies the cloud print service 200 (such as the domain name) and information that specifies a logical printer 210 selected by the user. The online storage, which has received the notification, sends the selected document data (or information such as a URL for specifying the document data) to the specified logical printer 210, and gives a print instruction. Accordingly, a job regarding printing of the document data is registered in the logical printer 210, and this job is provided to the image forming apparatus 130 in the above-described push method or pull method and is printed.

Note that, as has been conventionally done, the image forming apparatus 130 may have the function of displaying on the screen a list of document data (for example, document data for which the user has an access right to print; identifiable based on the in-house ID of the user) in a predetermined server (such as a file server) in the in-house network 100, obtaining a document selected by the user from the list, and printing the document. In this case, for example, in the case where the user selects "print" from a menu including processing types, such as "print" and "copy", provided by the UI unit 132, the UI unit 132 further accepts selection of either "print an in-house document" or "cloud print". In the case where the former is selected, the image forming apparatus 130 obtains document data from the in-house server using the above-mentioned conventional function, and prints the document data (in this case, ID conversion to a cloud ID is unnecessary). In the case where the latter is selected, the image forming apparatus 130 obtains print data from the cloud print service 200 in accordance with the above-mentioned printing flow illustrated in FIG. 9, and prints the print data. In another example, the image forming apparatus 130 may obtain a list of documents of a user who has logged in from the in-house server using the in-house ID of the user, obtain a list of print jobs from the cloud print service 200 using a cloud ID obtained by converting the in-house ID, display both of these lists together, and accept selection of a target to be printed from the user.

For some reasons, there may be a case in which a cloud ID in print data transmitted from the cloud print service 200 to the image forming apparatus 130 is not registered in the conversion table 142. To handle such an unknown account, an entry for an unknown account may be prepared in the conversion table 142. FIGS. 10 and 11 illustrate examples of the conversion table 142 including such an entry for an unknown account. In FIGS. 10 and 11, among three entries, the top two are entries for formally registered users; and the bottom entry is for an unknown account. That is, in the case where a cloud ID in print data matches none of cloud IDs in the formally registered entries, conversion rule of the bottom entry is adopted. In the example illustrated in FIG. 10, an unknown account is converted to the in-house ID "fx9999" of an existing specific user (such as the administrator; in the illustrated example, "suzuki@cloudprint.com"). In the example illustrated in FIG. 11, the in-house ID "Unknown" for an unknown account is prepared. In either case, a fee (the amount of usage) for printing regarding an unknown account is aggregated in association with an in-house ID corresponding to that unknown account.

In addition, the system of the exemplary embodiment is capable of handling a case in which there are multiple cloud print services 200. In this case, at the time of user setting, the administrator inputs a cloud ID for each cloud print service 200, in addition to a logical printer ID and an in-house ID. In response to this input information, the cloud print management server 120 sets, for each cloud print service 200, the corresponding cloud ID as a sharer of a logical printer 210 of the specified logical printer ID (if there is no such a logical printer 210, the cloud print management server 120 generates such a logical printer 210). In addition, the cloud print management server 120 registers an entry for each cloud print service 200 in the conversion table 142 in the image forming apparatus 130. In this case, as illustrated by way of example in FIG. 12, the item "service name" indicating a cloud print service 200 is set in the conversion table 142. In the example illustrated in FIG. 12, a cloud ID for each of two cloud print services "CloudPrint" and "PrintService" is registered for the same user (in-house ID "fx1234") in the conversion table 142. Conversion from a cloud ID to an in-house ID is the same as the case of the above-described example in which there is only one cloud print service 200.

In addition, an in-house ID for aggregation corresponding to an unknown account (cloud ID) may be prepared in the conversion table 142 in such a case corresponding to multiple cloud print services 200. Here, a rule indicating to which in-house ID an unknown account is converted may be prepared for each cloud print service 200. In the example illustrated in FIG. 13, an unknown account of the cloud print service "CloudPrint" is converted to the in-house ID "fx9999" of an existing user, and an unknown account of the cloud print service "PrintService" is converted to the dedicated in-house ID "Unknown". Needless to say, these are only exemplary, and, for example, unknown accounts of different cloud print services 200 may be converted to the same in-house ID. Note that to which cloud print service 200 account information (cloud ID) included in print data corresponds may be identified from a domain name or the like included in that ID.

In the above-described example, a cloud ID is converted to an in-house ID in accordance with the conversion table 142 provided in the image forming apparatus 130. However, this is only exemplary. Instead of providing the conversion table 142 in the image forming apparatus 130, the conversion table 142 may be provided in a specific server in the in-house network 100, and the cloud print management server 120 may maintain the conversion table 142 on that server in response to a user setting instruction from the administrator. In this case, the cloud print management server 120 itself may function as that specific server.

Handling of Temporary ID

In the above example, it has been described that a user who uses the image forming apparatus 130 has an in-house ID. However, there may be cases in which a user who does not have an in-house ID uses the in-house image forming apparatus 130. One example is the case in which a visitor to the company is permitted to use the image forming apparatus 130. In addition, the case where an employee user has forgotten to bring his/her IC card type ID card used for authentication using his/her in-house ID corresponds to such cases. In the following description, an exemplary case in which, as described here, a user who does not have an in-house ID uses the image forming apparatus 130 will be described.

In the following description, instead of the word "in-house ID" used so far, the word "local ID" will be used. A local ID represents the aspect that the local ID is user identification information in an organization such as a company, which is a local environment. If a "local environment" is a company, a "local ID" means the same thing as an "in-house ID".

In this example, a temporary local ID is given to a user who does not have a local ID.

For example, in the case of a system in which an IC card type ID card storing local ID information is given to each user and user authentication for using the image forming apparatus 130 is performed using that IC card, an IC card is temporarily lent to a user who does not have an IC card. An IC card to be temporarily lent stores a predetermined local ID dedicated for temporary use. That is, a local ID included in an IC card to be temporarily lent has a value distinguished from a local ID (such as an employee number) formally given to an employee.

The user, who has been temporarily lent an IC card, performs user authentication on the image forming apparatus 130 by using that IC card, and uses a function such as printing or copying provided by the image forming apparatus 130.

In a certain example, an employee who has forgotten his/her IC card and a person (such as a visitor or a guest) who does not have an IC card in the first place are handled differently. For example, even in the case where an employee who has forgotten his/her IC card uses the image forming apparatus 130 with a temporary local ID, that employee's formal local ID will be apparent in the end. Thus, the formal local ID is recorded in association with log information recording the temporary local ID. Accordingly, who among the employees of the company has used the image forming apparatus 130 becomes apparent, and a destination to which the fee for using the image forming apparatus 130 is to be billed (hereinafter may also be referred to as a "to-be-billed destination") becomes specifiable, for example. In contrast, in the case of a person such as a visitor or a guest who does not have a formal local ID, log information is not associated with a formal local ID.

In the following description, a temporary local ID given to an employee who has forgotten his/her IC card will be referred to as a "temporary ID", and a temporary local ID given to a person (such as a visitor) who does not have an IC card will be referred to as a "guest ID".

If the range of values of temporary IDs and the range of values of guest IDs are arranged in advance, a device (such as the image forming apparatus 130) in the in-house network 100 is capable of distinguishing between a temporary ID and a guest ID from the value of an input local ID.

Figure 14:
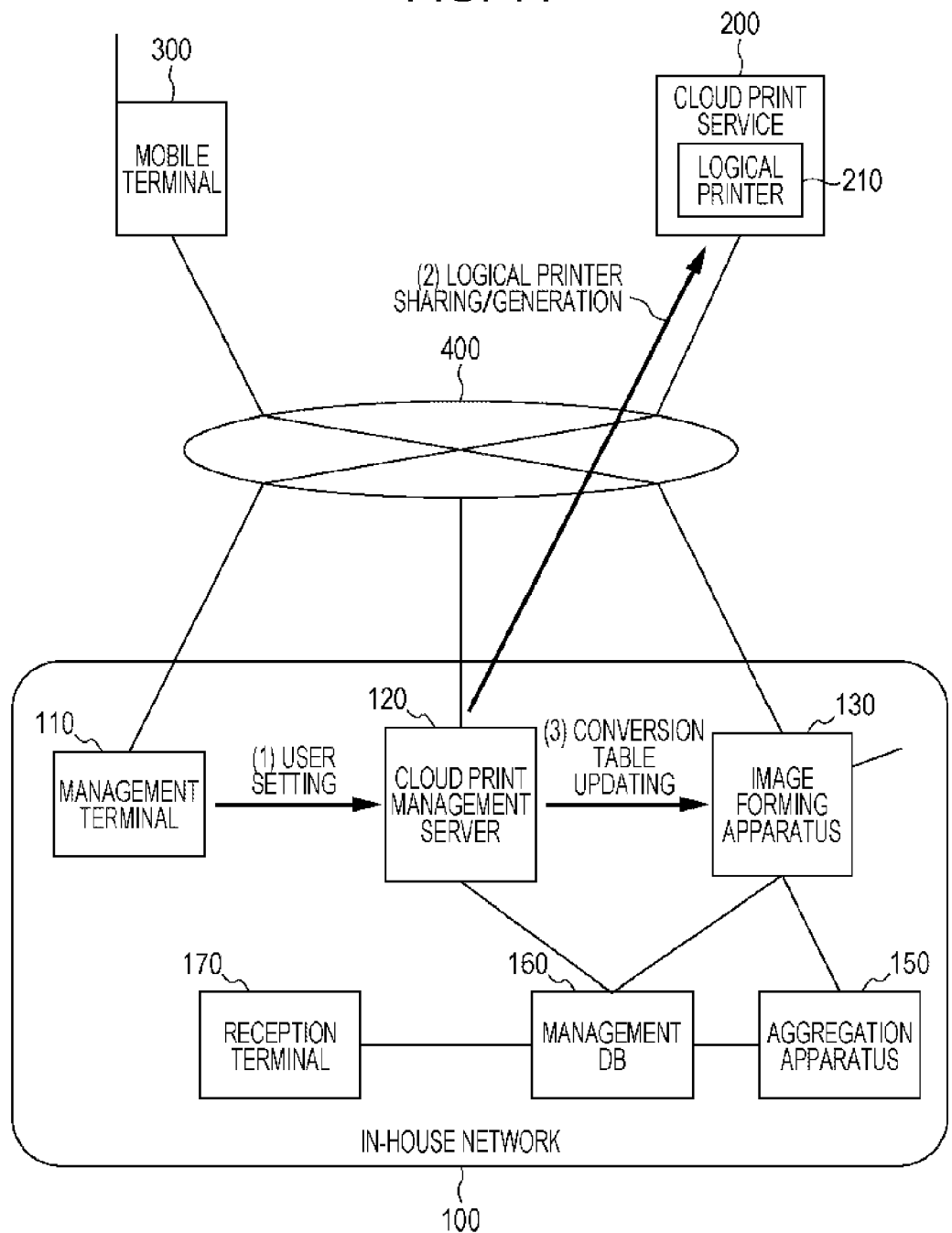
FIG. 14 is a diagram illustrating an example of a system using a temporary local ID (in-house ID)

FIG. 14 is a diagram illustrating an example of the configuration of a system in this example. In FIG. 14, elements that are the same as or similar to those illustrated in FIG. 1 are given the same reference numerals, and detailed descriptions thereof are omitted.

In the system example illustrated in FIG. 14, compared with the system example illustrated in FIG. 1, an aggregation apparatus 150, a management database (DB) 160, and a reception terminal 170 are added to the in-house network 100. The aggregation apparatus 150 collects and records log information on the usage (such as printing and copying) of each user from each image forming apparatus 130 in the in-house network 100, and aggregates the amount of usage and the amount of fee of each user and each section on the basis of the collected log information.

The management DB 160 is a database that manages management information of users and organizations in the in-house network 100. Various examples of the management information held by the management DB 160 will be given hereinafter. In the following description, it is described that these various types of management information are collectively managed by one management DB 160 in order to make the description concise. However, this is not essential. Alternatively, a discrete database configuration may be adopted in which various types of management information are configured as separate databases in separate computers. Alternatively, the functions of the cloud print management server 120 (particularly the conversion table 142) may be incorporated in the management DB 160 (in this case, the cloud print management server 120 is unnecessary).

The reception terminal 170 is a terminal for the work of issuing a temporary ID such as a temporary ID or a guest ID. For example, the reception terminal 170 is located at the reception of an organization such as a company.

An employee who has forgotten his/her IC card tells a receptionist at the reception that he/she has forgotten the IC card. After the employee has been checked that he/she is an employee, the employee receives a temporary IC card storing a temporary ID (a temporary IC card is temporarily lent). At this time, the receptionist operates the reception terminal 170 to register in the management DB 160 management information of the issued temporary ID. FIG. 15 illustrates an example of temporary ID management information recorded in the management DB 160.

In the example illustrated in FIG. 15, the information recorded in association with the temporary ID issued to the employee (which is stored in the IC card temporarily issued at the reception) includes the regular local ID of the employee (that is, the employee ID stored in the forgotten employee ID card) and the effective period of the temporary ID. Among these pieces of information, the temporary ID is simply read from the temporary IC card to be issued, for example. In addition, because who the employee is has been specified at the time of issuing the temporary IC card, the receptionist simply registers the employee's formal local ID in association with the temporary ID. The effective period is simply input by the receptionist in accordance with in-house rules, for example. In the example illustrated in FIG. 15, the temporary ID is arranged to take a value within the range from "fx50000" to "fx59999", which is only given here by way of example. Note that an employee who has been given a temporary ID has a formal local ID, and the corresponding relationship between this formal local ID and a cloud ID is registered in the conversion table 142.

A visitor (guest) who is not an employee tells the receptionist at the reception his/her name, an organization (such as a company) to which he/she belongs, and the like, and tells the destination of his/her visit, and the guest is checked whether he/she is allowed to enter the company. After it has been confirmed by an employee or a division at the destination of the guest's visit that the guest is allowed to enter the company, the receptionist temporarily issues a guest IC card. In association with a local ID (guest ID) stored in the guest IC card, various types of information on the guest are registered in the management DB 160. FIG. 16 illustrates an example of guest ID management information recorded in the management DB 160.

In the example illustrated in FIG. 16, the effective period of the issued guest ID (stored in the IC card) and various types of information on the guest (the name of the guest, information indicating an organization to which the guest belongs, information on the destination of the visit, and a cloud ID in the illustrated example) are registered in association with the guest ID. In the example illustrated in FIG. 16, the guest ID is arranged to take a value within the range from "fx90000" to "fx99999", which is only given here by way of example.

As information on the destination of the visit, if the destination of the visit is an employee, the formal local ID of that employee ("fx10002" in the example illustrated in FIG. 16) is registered; if the destination of the visit is a division, a code specifying that division ("dv123" in the example illustrated in FIG. 16) is registered.

Alternatively, if the destination of the visit is a project, a code specifying that project ("pr345" in the example illustrated in FIG. 16) is registered in the information on the guest. Here, a "project" is a temporarily set user group, in contrast to a division that is permanently set as a premise. For example, a group is configured of employees from multiple divisions in order to develop a certain product. This group, which exists for the duration of the development, is an example of a project. Alternatively, it is possible to manage an event such as one held at a company or an academic conference as a project.

A cloud ID may be registered by a guest as occasion arises. For example, if there is a possibility that the guest performs printing using the cloud print service 200 with an in-house image forming apparatus 130, the guest tells the receptionist his/her cloud ID, and the receptionist registers the cloud ID in the management DB 160. In the example illustrated in FIG. 16, since there are possibilities that "Hanako Suzuki" and "Jiro Tanaka" perform printing using the cloud, they have registered their cloud IDs in the management DB 160.

In response to registration by a guest of his/her cloud ID, there becomes a pair of the guest ID and the cloud ID. The management DB 160 registers that pair in the conversion table 142 in the image forming apparatus 130 via the cloud print management server 120 or directly.

In the example illustrated in FIG. 16, a guest information management ID is provided to distinguish information on each guest (such as a set of a guest ID, effective period, and guest name). A guest ID (local ID issued to a guest) is an ID fixedly built into an IC card and is used for multiple guests, as in the case where the IC card is returned from one guest and then temporarily lent to the next guest. In contrast, a guest information management ID is unique to each visit, that is, unique to each set of a guest ID and its effective period. A guest information management ID is provided in order to easily associate log (processing history) information of the use of the image forming apparatus 130 and information on the guest and is not essential (because such association may be performed on the basis of information on the guest ID and the effective period).

In the case of a prescheduled guest, information on the name of the guest, an organization to which the guest belongs, the destination of the visit, and the like may be registered in the management DB 160 prior to the visit, and, upon the guest's visit, a guest ID held in a guest IC card temporarily lent to the guest may be registered in association with the pre-registered information in the management DB 160.

Next, an example of recording log information in the case where a user who is given a temporary ID or a guest ID uses the image forming apparatus 130 will be described.

FIG. 17A illustrates an example of log information generated by the image forming apparatus 130, and FIG. 17B illustrates an example of log information managed by the aggregation apparatus 150 which collects log information from each image forming apparatus 130.

In the example illustrated in FIG. 17A, the time and date on which the image forming apparatus 130 has performed processing, the type of the processing (types such as copying, printing, and facsimile sending), and the local ID of a user who has instructed the image forming apparatus 130 to perform that processing are recorded in log information generated by the image forming apparatus 130.

In the case of processing performed by a user who operates the UI unit 132 of the image forming apparatus 130, the user's local ID is simply read by a reading device connected to the image forming apparatus 130 from an IC card presented by that user for user authentication. If the IC card is one for temporary use, the read local ID is a temporary ID; if the IC card is one for a guest, the read local ID is a guest ID. Processing performed by a user who operates the UI unit 132 of the image forming apparatus 130 includes, for example, copying of a paper document, sending a facsimile, printing of image data saved in a storage area of security printing, and printing using the cloud print service 200 from the UI unit 132.

Meanwhile, in the case where a user directly accesses the cloud print service 200 from a device unconnected to the in-house network 100 (such as the mobile terminal 300) via the Internet 400 and gives a print instruction while specifying the image forming apparatus 130 as an output destination, the image forming apparatus 130 is unable to directly obtain the local ID of that user, who has given the print instruction, from information from the cloud print service 200. In this case, the image forming apparatus 130 converts a cloud ID sent from the cloud print service 200 to a local ID by referring to the conversion table 142, and records the cloud ID in a log.

In addition, the log information generated by the image forming apparatus 130 may include, besides the above information, various types of information regarding the executed processing, such as parameters of the processing. For example, when copying or printing has been executed, information such as the number of output prints as a result thereof, the type of printing such as color printing or monochrome printing, and the like is recorded as items of log information. For example, in the case of facsimile sending or email sending, information on the sending destination (facsimile number or email address) and the like is recorded as items of log information.

In addition, in the case where printing using the cloud has been performed, the cloud ID of the user, which is used in logging into the cloud print service 200 upon printing, is recorded in the log information. In this case, for example, the cloud ID sent along with the print data from the cloud print service 200 may be recorded in the log information, or the cloud ID input by the user to the image forming apparatus 130 upon giving an instruction to perform printing using the cloud may be recorded in the log information. In contrast, in the case of closed processing in the in-house network 100, the cloud ID is not recorded in the log information.

In addition, the log information may further include an image log. An image log is data representing an image processed by the image forming apparatus 130. For example, in the case where copying has been performed, the image forming apparatus 130 records image data of a read document as an image log and records the image log as an item of the log information of the copying. Alternatively, in the case where print data in a page description language sent from a PC has been printed, the image forming apparatus 130 records image data generated by analyzing the print data, or the print data itself as an image log. Image data recorded as an image log may be the image data itself used in copying or printing, or data with a reduced amount of data generated by performing image compression or pixel skipping of the image data. In the example illustrated in FIGS. 17A and 17B, a Joint Photographic Experts Group (JPEG) image data generated by compressing an original image in the JPEG format is recorded as an image log in the case of copying (needles to say, this is only an example).

Because the image log is recorded in association with the local ID and the cloud ID in this example, for example, it is possible to track who has performed printing using the cloud and what kind of an image has been printed.

In the case where printing using the cloud has been performed, print data (such as PDF data) sent from the cloud print service 200 may be recorded as an image log, or image data which is a processing target as in the case where local copying or printing is performed in response to an instruction from a PC in the in-house network 100 may be recorded as an image log.

In the case of printing using the cloud, among the items of log information illustrated by way of example in FIGS. 17A and 17B, items other than the image log and the local ID may be obtained from information included in a print ticket sent to the image forming apparatus 130 along with print data from the cloud print service 200. Therefore, in the case of printing using the cloud, the image forming apparatus 130 may record a pair of print data (such as PDF data) and a print ticket as log information. In this case, print data corresponds to an image log, and a print ticket corresponds to another log item.

By applying a digital signature based on a digital certificate of the image forming apparatus 130 itself (that is, an electronic signature based on a secret key corresponding to the digital certificate) to an image log recorded by the image forming apparatus 130, even if someone tampers with the image log saved in the image forming apparatus 130, aggregation apparatus 150, or the like, the tampering becomes detectable.

In addition, a digital signature based on a digital certificate of the cloud print service 200 may be applied to print data or a print ticket sent from the cloud print service 200 to the image forming apparatus 130, and the signature may be verified by the image forming apparatus 130. With this verification, if someone tampers with the print data or the like on the way, the tampering is detectable, and, in response to this detection, error processing such as stopping the printing may be performed. In addition, a digital certificate of a reliable cloud print service 200 may be registered in advance in the image forming apparatus 130, and, among items of signed print data or the like coming from the outside, print data that is unverifiable with the registered digital certificate may not be printed by the image forming apparatus 130.

Log information generated by the image forming apparatus 130 does not necessarily include the values of all the items illustrated by way of example in FIG. 17A. For example, log information on the first row in FIG. 17A represents that copying of a paper document has been performed by a guest with the local ID "fx90001" with the image forming apparatus 130. Since no cloud ID is used in a copy operation, the log information does not include the value of a cloud ID. That is, in this case, by presenting a guest IC card that has been lent to the guest to a card reader of the image forming apparatus 130, the guest is allowed to use the image forming apparatus 130, and gives a copy instruction to the image forming apparatus 130. In response to this, the image forming apparatus 130 executes copy processing, and records in the log memory 148 log information including the local ID "fx90001" that has been read from the IC card. In this case, since no cloud ID has been used, the log information includes no cloud ID.

Log information on the second row in FIG. 17A is generated in the case where a guest with the cloud ID "suzuki52@cloudprint.com" (see FIG. 16) directly gives a print instruction from the guest's mobile terminal 300 to the cloud print service 200, without using the UI unit 132 of the image forming apparatus 130, while specifying the image forming apparatus 130 as an output destination. In this example, the cloud print service 200 sends print data together with the information of the cloud ID "suzuki52@cloudprint.com" to the image forming apparatus 130. The image forming apparatus 130 obtains that a local ID corresponding to this cloud ID is "fx90002" from the conversion table 142, and records log information including the local ID "fx90002" and the cloud ID "suzuki52@cloudprint.com".

Even in the case where a guest operates the UI unit 132 of the image forming apparatus 130 to access the cloud print service 200 and prints a document on the cloud with the image forming apparatus 130 via the cloud print service 200, the image forming apparatus 130 similarly records log information including the guest's local ID and cloud ID.

Log information on the third row in FIG. 17A is generated in the case where an employee who has been lent an IC card storing the temporary ID "fx50001" (the employee's formal local ID is "fx12345"; see FIG. 15) directly gives a print instruction from his/her mobile terminal 300 to the cloud print service 200 while specifying the image forming apparatus 130 as an output destination. Here, it is assumed that the employee has registered his/her cloud ID "efgbc@cloud" in the cloud print management server 120 in advance, and, in response to this, the corresponding relationship between the local ID "fx12345" and the cloud ID "efgbc@cloud" has been registered in the conversion table 142 in the image forming apparatus 130. If the employee gives a print instruction to the cloud print service 200 using the cloud ID "efgbc@cloud" while specifying the image forming apparatus 130 as an output destination, the cloud print service 200 sends print data together with the information of the cloud ID "efgbc@cloud" to the image forming apparatus 130. The image forming apparatus 130 obtains that a local ID corresponding to the cloud ID is "fx12345" from the conversion table 142, and records log information including the local ID "fx12345" and the cloud ID "efgbc@cloud".

Log information on the fourth row in FIG. 17A is generated in the case where an employee who has been lent an IC card storing the temporary ID "fx50000" (the employee's formal local ID is "fx23456"; see FIG. 15) operates the UI unit 132 of the image forming apparatus 130 to access the cloud print service 200, and prints a document on the cloud with the image forming apparatus 130 via the cloud print service 200. Here, it is assumed that the employee has registered his/her cloud ID "abcde@cloud" in the cloud print management server 120 in advance, and, in response to this, the corresponding relationship between the local ID "fx23456" and the cloud ID "abcde@cloud" has been registered in the conversion table 142 in the image forming apparatus 130. If the employee performs user authentication at the image forming apparatus 130 using the temporary IC card "fx50000", inputs the cloud ID "abcde@cloud" to the UI unit 132, and gives a print instruction via the cloud print service 200, the image forming apparatus 130 stores the corresponding relationship between the temporary ID "fx50000" and the cloud ID "abcde@cloud". In response to this print instruction, the cloud print service 200 sends print data together with the information of the cloud ID "abcde@cloud" to the image forming apparatus 130, and the image forming apparatus 130 performs printing using the print data. The image forming apparatus 130 records, as a local ID in log information of this printing processing, the temporary ID "fx50000" corresponding to the cloud ID "abcde@cloud". In addition, by referring to the conversion table 142, the image forming apparatus 130 may obtain that a formal local ID corresponding to the cloud ID is "fx23456", and additionally record this formal local ID "fx23456".

In the above example, the image forming apparatus 130 may be configured to accept a print instruction only from a user who has been registered in advance in the in-house network 100 (an employee or a registered guest). Here, for example, the image forming apparatus 130 may execute a print instruction sent from the cloud print service 200 only when the cloud ID of a person who has given the print instruction (this ID is sent along with print data), which is included in the print instruction, is included in either (A) the conversion table 142 (and guest ID management information) or (B) the corresponding relationship between a local ID and a cloud ID stored in the image forming apparatus 130 in the case where the print instruction has been given from the UI unit 132 of the image forming apparatus 130 to the cloud print service 200. Here, in (B) case, after user authentication based on an IC card is successful, a cloud ID is input to the UI unit 132, and printing via the cloud print service 200 is performed. Therefore, because the cloud ID has been confirmed by authentication of the IC card who is owned by a user who has already been accepted in the in-house network 100, even if the cloud ID has not been registered in the conversion table 142 yet, it may be confirmed that the print instruction is an instruction given from that user. Each image forming apparatus 130 in the in-house network 100 generates the above-described log information every time the image forming apparatus 130 performs processing in response to an instruction from a user, and saves the log information in a built-in memory device.

In a first example, log information recorded by each image forming apparatus 130 is collected by the aggregation apparatus 150 at a predetermined frequency such as once a day or in a preset non-busy period (such as at night or during a lunch break). If the capacity of a communication line between each image forming apparatus 130 and the aggregation apparatus 150 is sufficiently large (that is, the communication line is sufficiently fast), log information generated by the image forming apparatus 130 may be instantly registered in the aggregation apparatus 150; if the capacity of the communication line is limited, the log information may be collected in a non-busy period in order to suppress effects on a normal communication traffic.

In the examples illustrated in FIGS. 17A and 17B, in log information managed by the aggregation apparatus 150, which is illustrated in FIG. 17B, the item "ID user" is added to log information generated by the image forming apparatus 130, which is illustrated in FIG. 17A. The "ID user" is information that specifies a user who has used the image forming apparatus 130 using an IC card with a temporary ID or a guest ID. Therefore, the information "ID user" is not included in log information generated in the case where an employee uses the image forming apparatus 130 after performing user authentication with his/her regular (formal) local ID (employee ID) because the local ID recorded in the log information is the "ID user" himself/herself.

In the case of processing using a temporary ID, the regular local ID of a user who has given an instruction for this processing is registered in the "ID user" column. Alternatively, in the case of processing using a guest ID, information that specifies who a user (guest) who has given an instruction for this processing is, that is, a guest information management ID that specifies information on the guest registered in the management DB 160 in the example illustrated in FIG. 17B, is registered. Instead of the guest information management ID, guest information itself (such as the name, an organization to which the guest belongs, etc.; see FIG. 16) may be recorded as the "ID user" information.

The value of the "ID user" in the log information may be specified by collating, for example, a combination of a local ID (temporary ID or guest ID) and the processing time and date included in the log information with a combination of a temporary ID or a guest ID recorded in the temporary ID management information (see FIG. 15) or the guest ID management information (see FIG. 16) and the ID's effective period. For example, in the example illustrated in FIGS. 17A and 17B, in the case of copying performed by a user with the local ID (guest ID) "fx90001" at 10:25:20 on Apr. 1, 2013, a combination of the guest ID and the time and date matches a combination of the guest ID and the effective period of the guest information management ID "gt123456" in FIG. 16. Thus, the guest information management ID "gt123456" is recorded in the "ID user" line.

In addition, in the case of printing processing performed by a user with the local ID "fx12345" at 10:28:20 on Apr. 1, 2013, it becomes clear that a combination of the local ID "fx12345" and the time and date corresponds to the temporary ID "fx50001" in FIG. 15. That is, this processing is printing processing via the cloud performed while the temporary ID "fx50001" has been temporarily given to a user who has his/her formal local ID "fx12345". In log information recorded by the aggregation apparatus 150, the temporary ID "fx50001" is recorded as the local ID of the user who has given the print instruction, and the user's formal local ID "fx12345" is recorded as an ID user.

In the case of printing processing performed by a user with the temporary ID "fx50000" at 10:31:30 on Apr. 1, 2013, it becomes clear at the time of printing that the temporary ID is "fx50000", and that the formal local ID is "fx23456". In this case, in log information recorded by the aggregation apparatus 150, the temporary ID "fx50000" is recorded as the local ID of the user who has given the print instruction, and the user's formal local ID "fx23456" is recorded as an ID user.

Although omitted in the drawings, information that specifies the to-be-billed destination of processing performed by the image forming apparatus 130 may be recorded in the log information.

In the example illustrated in FIG. 17A, the "ID user" information is not included in the log information recorded by the image forming apparatus 130; this is because of the following reason. That is, in order to specify the "ID user", it is necessary for the image forming apparatus 130 to access the management DB 160 and refer to management information of a temporary ID or a guest ID. If the capacity of a communication line between the image forming apparatus 130 and the management DB 160 is small (low speed), it takes much time to refer to the information, or part of the computing power of the image forming apparatus 130 is used to refer to the information. For these reasons, it takes time from when a user gives a processing instruction to the image forming apparatus 130 to when the image forming apparatus 130 actually starts the processing. In the example illustrated in FIG. 17A, in order to prevent such a delay in the start of processing, the image forming apparatus 130 does not specify the "ID user", but the aggregation apparatus 150 specifies the "ID user".

Alternatively, in the case where, for example, the capacity of a communication line between the image forming apparatus 130 and the management DB 160 is sufficiently large, if a delay in the start of processing for which an instruction has been given from a user is unlikely to be caused even when the image forming apparatus 130 specifies the "ID user", the image forming apparatus 130 may record the "ID user" as part of the log information.

A temporary or guest IC card that has been temporarily issued to an employee or guest is returned to the reception when the employee or guest exits the company. The returned temporary or guest IC card will be temporarily issued to another employee or guest at a later time.

This method of re-using a temporary or guest IC card (and a local ID included therein) is only exemplary. Instead of this method, a temporary ID card on which a completely unique temporary ID or guest ID is printed as a code image such as a barcode may be issued to a user. In this case, a reading device connected to the image forming apparatus 130 simply recognizes the code image printed on the ID card presented by the user, and obtains the user's local ID (temporary ID or guest ID).

As has been described so far, even in the case where a temporary local ID such as a temporary ID or a guest ID is used, printing using the cloud may be performed, and the temporary ID or guest ID of the user who has given a printing instruction may be recorded in log information of that printing. In addition, detailed information on an employee or guest corresponding to the recorded temporary ID or guest ID may be specified, and the specified information may be associated with the log information.

Billing Processing

Next, an example of billing processing in this system will be described.

In this example, besides the method of billing the local ID of a user who has given an instruction to execute processing, the method of changing the a destination to which the fee for the processing is to be billed to a to-be-billed destination specified by the user is also provided. As an example of the latter method, for example, there is a case in which the to-be-billed destination of processing performed by an employee using the image forming apparatus 130 is changed to the budget of a division (department) or project in the company to which the user belongs. As another example of changing the to-be-billed destination, for example, there is a case in which the fee for processing performed by an employee using a temporary ID is billed to the employee's regular (formal) local ID, or a case in which the fee for processing performed by a guest using a guest ID is billed to an in-house division that has invited that guest.

To change the to-be-billed destination as in the above cases, management information of users (employees), divisions, and projects illustrated in FIGS. 18 to 20 is registered in, for example, the management DB 160 in the in-house network 100.

In the user management information illustrated in FIG. 18, in association with the local ID (regular one) of each employee, a division code indicating a division to which the employee belongs and a project code indicating a project to which the employee currently belongs are registered. In the case where one employee is simultaneously participating in multiple projects, codes of the projects in which the employee participates are registered in the user management information. In the example illustrated in FIG. 18, the employee "fx10001" participates in two projects "pr012" and "pr123". If it is assumed that an employee will be notified of processing performed by the image forming apparatus 130, the employee's contact information (such as an email address or the address of an instant message service) may be registered as an item of the user management information.

In the division management information illustrated in FIG. 19, in association with a division ID (may also be referred to as a "division code") that uniquely identifies each division in a company (organization), that division's name and contact information (such as an email address, the address of an instant message service, or a telephone number) of a representative who is in charge of that division are registered.

In the project management information illustrated in FIG. 20, in association with a project ID (may also be referred to as a "project code") that uniquely identifies each project that has been temporarily organized, that project's name and contact information (such as an email address, the address of an instant message service, or a telephone number) of a representative who is in charge of that project are registered.

In the case where an employee performs user authentication on the image forming apparatus 130 by using his/her regular local ID, the image forming apparatus 130 causes the user to specify the to-be-billed destination of processing performed by the user. In one example, information on a division and a project(s) to which the user belongs corresponding to the local ID is read from the management DB 160, and, on the basis of the read result, a user interface (UI) screen is generated on which the employee and the division and project(s) to which the employee belongs are given as candidates for a to-be-billed destination. From the UI screen, the user selects a to-be-billed destination of this processing. Upon selecting a to-be-billed destination, the user may be asked to enter a password corresponding to a division or project to which the user belongs, and, if the entered password is correct, the user may be able to select that division or project as a to-be-billed destination.

Instead of presenting to the user candidates for a to-be-billed destination and having the user select one from among the candidates, a to-be-billed destination may be specified by having the user directly input the code (ID) of a division or project serving as a to-be-billed destination by using a keypad or the like of the image forming apparatus 130. In this case, the user management information may not include information on a division or project(s) to which each user belongs. Also in this case, to check that the user has a legitimate right to a division or project input by the user as a to-be-billed destination, the user may be asked to enter authentication information such as a password corresponding to the division or project.

In addition, a division code or project code serving as the to-be-billed destination of processing performed using the image forming apparatus 130 may be set in the image forming apparatus 130. One example is the case in which the code of a division or project serving as a to-be-billed destination is set in the image forming apparatus 130 located in the division or the image forming apparatus 130 set to be dedicated for the project.

In the case where a user is authenticated with an IC card by the image forming apparatus 130 and performs printing using the cloud while specifying a to-be-billed destination on the UI unit 132, in one example, the image forming apparatus 130 stores the to-be-billed destination specification information in association with the user's local ID read from the IC card. In the case where print data of the user that arrives from the cloud print service 200 while the user authentication is effective (that is, until when the user explicitly performs a logout operation or time runs out) is printed, the stored to-be-billed destination information is recorded in log information. Whether print data from the cloud print service 200 is from a user who has been authenticated may be determined by obtaining a local ID that corresponds to a cloud ID that accompanies the print data from the conversion table 142, and determining whether the local ID matches a local ID stored in association with the to-be-billed destination information. In the case where the user uses an IC card storing a temporary ID, a local ID (formal one) obtained from the conversion table 142 does not match a local ID (temporary ID) stored in association with the to-be-billed destination. To handle such a case, a temporary ID corresponding to a local ID obtained from the conversion table 142 is obtained from the temporary ID management information (FIG. 15), and a to-be-billed destination stored in association with the temporary ID is simply recorded in a log.

In another example of the case where printing using the cloud is performed, a to-be-billed destination specified in such a manner by the user or to-be-billed destination information set in the image forming apparatus 130 is set as a uniquely defined element in the logical printer 210 of the cloud print service 200. The image forming apparatus 130 reads a to-be-billed destination from the uniquely defined element in print setting information sent along with print data from the logical printer 210, and records the to-be-billed destination in a log. This method uses an inherent function of the cloud print service 200, which sends print setting information set in the logical printer 210 (for example, information indicating the functions used in printing, such as duplex printing and collation) to a physical printer at an output destination in association with print data.

For example, Google Cloud Print is configured to hold print setting information (referred to as a "print ticket" or a "job ticket") in association with the logical printer 210, and, when providing print date from the logical printer 210 to its physical printer, additionally provide the print setting information. The print setting information may include an element that the user may uniquely define (referred to as a "uniquely defined element"). Therefore, by setting the setting information including a uniquely defined element including to-be-billed destination information in the logical printer 210, the to-be-billed destination information may be transferred, together with print data, to the image forming apparatus 130.

Although Google Cloud Print has been described by way of example here, associating an element similar to a print ticket with print data transferred from a logical printer to a physical printer is widely done in the overall printing systems, and the probability of adopting this function in other public print services including other cloud types is high.

As a method of setting a print ticket (print setting information) including a uniquely defined element that indicates a to-be-billed destination in the logical printer 210 in the cloud print service 200, there is a method of sending a logical printer generation instruction with which such a print ticket is associated to the cloud print service 200. For example, when the print control technology of the ".NET Framework" (trademark) developed by Microsoft (registered trademark) is used, print setting information is configured as an instance in the PrintTicket class. For example, the image forming apparatus 130 which has received a specification of a to-be-billed destination from a user via the UI unit 132 sends a logical printer generation instruction, together with a print ticket including information on the to-be-billed destination, to the cloud print service 200. Upon receipt of the logical printer generation instruction, the cloud print service 200 newly generates a logical printer 210 in which the print ticket is set. This method may be used by way of example. When an instruction to print document data is given to the logical printer 210 generated in response to the logical printer generation instruction, the logical printer 210 converts the document data to print data in a page description language, and sends the print data, together with the print ticket (including the specification information of the to-be-billed destination), to the image forming apparatus 130.

As another method, there is a method of generating a logical printer 210 in which, instead of a print ticket, a uniquely defined element including to-be-billed destination information is incorporated in setting information that indicates the capability information of a physical printer associated with the logical printer 210 (information that represents the capability of a physical printer, such as whether the printer is capable of performing, for example, duplex printing and/or color printing). In this method, the image forming apparatus 130 incorporates an element that indicates a to-be-billed destination in setting information that indicates the capability information thereof, and sends a logical printer generation instruction with which the setting information is associated to the cloud print service 200. In response to the logical printer generation instruction, the cloud print service 200 generates a logical printer 210 in which the setting information is set. When the print control technology of the ".NET Framework" (trademark) is used, the setting information is configured as an instance in the PrintCapability class. In this method, a client apparatus (such as the image forming apparatus 130) that is to perform printing using the logical printer 210 receives, from the logical printer 210, setting information that indicates the capability of a physical printer to be used (such as PrintCapability), and accepts a choice(s) selected by a user from among choices of various functions included in the setting information. The result of the selected choice(s) becomes print setting information for the printing. Here, when a uniquely defined element that indicates a to-be-billed destination is incorporated in the setting information provided to the client apparatus, that element is handed over to the print setting information. The print setting information is sent from the client apparatus to the cloud print service 200 and is set in the logical printer 210. The print setting information (including the to-be-billed destination information) is associated with print data sent from the logical printer 210 to the physical printer (such as the image forming apparatus 130 itself). That is, in this method, for example, the image forming apparatus 130 which has received a specification of a to-be-billed destination from a user via the UI unit 132 sends a logical printer generation instruction, together with printer capability setting information (an instance in the PrintCapability class) including an element that indicates a to-be-billed destination, to the cloud print service 200. Upon receipt of the logical printer generation instruction, the cloud print service 200 newly generates a logical printer 210 in which the print ticket is set. This method may be used by way of example. When an instruction to print document data is given from the image forming apparatus 130 to the logical printer 210 generated in response to the logical printer generation instruction, the logical printer 210 converts the document data to print data in a page description language, and sends the print data, together with the print ticket (including the specification information of the to-be-billed destination), to the image forming apparatus 130.

Both methods use the inherent function of the cloud print service 200, which associates, when the logical printer 210 sends print data to a physical printer such as the image forming apparatus 130, setting information set therein with the print data and sends the setting information and the print data. Therefore, there is no need to change the functions of or add functions to the existing cloud print service 200 in order to realize this mechanism. It is only necessary to add, to the image forming apparatus 130, the function of instructing the cloud print service 200 to generate such a logical printer 210.

In this case, a print ticket sent from the logical printer 210 to the image forming apparatus 130 along with print data includes, as illustrated in FIG. 21, a to-be-billed destination that is a uniquely defined element set in the logical printer 210. In the example illustrated in FIG. 21, the print ticket includes, as a uniquely defined element, the code "pr456" of a project serving as a to-be-billed destination selected by a user who has given a print instruction.

The image forming apparatus 130, which has received the print ticket along with the print data, records the to-be-billed destination code extracted from the print ticket as an item of log information regarding printing of the print data (see the third item of log information from the top in FIG. 23). The recorded to-be-billed destination code is used in aggregation of fees at the aggregation apparatus 150. That is, in aggregation of fees by the aggregation apparatus 150, the amount of fee for processing corresponding to each piece of log information is added to, for example, the value of a total fee corresponding to a to-be-billed destination code included in that piece of log information.

In the above case, a print ticket or print capability setting information is sent to the cloud print service 200, and the cloud print service 200 is caused to newly generate a logical printer 210 in which the print ticket or the like is set. However, this case is only exemplary. Alternatively, to-be-billed destination information may be set in a print ticket or print capability setting information in an already existing logical printer 210 in the cloud print service 200, for which the user has authority to use. Also in this method, the print ticket including the to-be-billed destination information accompanies print data that comes from the logical printer 210.

In the case of the method of newly generating and using a logical printer 210 in which to-be-billed destination information is set, the used logical printer 210 is deleted when printing processing ends, for example. In the case of the method of setting information including to-be-billed destination information in an existing logical printer 210, the to-be-billed destination setting information is deleted from the used logical printer 210 when printing processing ends, for example. In response to these deletions, the logical printer 210 including the to-be-billed destination information is prevented from being used by other users.

In another example, a logical printer 210 may be generated in the cloud print service 200 for each to-be-billed destination (each employee, each division, and each project), and the image forming apparatus 130 may give a print instruction to a logical printer 210 corresponding to a to-be-billed destination specified by the user via the UI unit 132. In a logical printer 210 for each to-be-billed destination, a to-be-billed destination code (local ID, division code, etc.) that specifies the to-be-billed destination is set as a uniquely defined element. A logical printer 210 provides the image forming apparatus 130 with print data along with a print ticket including the to-be-billed destination code of the logical printer 210, and the image forming apparatus 130 records the to-be-billed destination code in the print ticket in log information. In this case, information of the local ID of a user who has given the print instruction is set in a logical printer 210 corresponding to the selected to-be-billed destination. The information of the local ID is incorporated in a print ticket, and the print ticket is provided to the image forming apparatus 130 along with print data. The information of the local ID may be deleted upon finishing of the printing.

The foregoing example is the case in which an employee performs printing using his/her regular local ID. Meanwhile, in the case where a temporary IC card (temporary ID) is issued to an employee who has forgotten his/her regular IC card and the employee uses the image forming apparatus 130 using the temporary ID, the fee for the use of the image forming apparatus 130 is billed to the employee's regular local ID, for example. That is, in the case where a local ID included in log information collected from the image forming apparatus 130 is a temporary ID, the aggregation apparatus 150 obtains a regular local ID corresponding to the temporary ID from temporary ID management information (see FIG. 15), and adds the amount of fee for processing corresponding to the log information to the total amount of fee billed to the regular ID.

In another example, a user who has performed user authentication on the image forming apparatus 130 using a temporary ID may be asked to enter a division code or a project code serving as a to-be-billed destination, and the entered code of the to-be-billed destination may be recorded in log information. In this case, in the case of printing using the cloud, in one example, the image forming apparatus 130 stores a to-be-billed destination specified by the user as described above and a temporary ID used by the user in authentication, and, when print data from the cloud print service 200 is printed, the stored to-be-billed destination and the temporary ID are recorded in log information. In another example, the code of an input to-be-billed destination is set in a logical printer 210, and the to-be-billed destination code included in a print ticket that is sent along with print data from the logical printer 210 is recorded by the image forming apparatus 130 in log information.

Further, the following method may be used. That is, in this method, the image forming apparatus 130 sends a temporary ID presented by a user in user authentication to the management DB 160. In response to this, the management DB 160 specifies a regular local ID corresponding to the temporary ID, specifies a division and each project, to which the user belongs, corresponding to the specified regular ID, and provides the image forming apparatus 130 with a list including the specified division and project(s). The image forming apparatus 130 causes the user to select a to-be-billed destination from the list, sets the selected to-be-billed destination in a logical printer 210, and performs printing using the logical printer 210. In response to this, the logical printer 210 provides the image forming apparatus 130 with print data and a print ticket including the code of the to-be-billed destination, and the image forming apparatus 130 records the to-be-billed destination code extracted from the print ticket in log information of printing of the print data.

Here, an example of payment corresponding to a cloud account (cloud ID) includes, for example, Google Wallet (registered trademark) corresponding to the Google account of a user who has performed printing using Google Cloud Print as the cloud print service 200.

In the case of printing using the cloud print service 200, a user enters his/her cloud ID for giving a print instruction. Thus, a payment system in the in-house network 100 simply accesses the cloud service, bills the amount of fee for the printing to an account corresponding to the cloud ID, and settles the payment.

The fee for processing not using the cloud print service 200 (such as copying of a paper document) may be settled with the cloud account of a guest. In this case, at the time a guest ID is issued at the reception terminal 170 to a guest or a guest gives an instruction to the image forming apparatus 130 to perform processing, the guest is asked to enter his/her cloud ID, and the fee for a cloud service may be settled using the cloud ID in billing processing.

FIG. 22 illustrates an example of guest management information including information on a billing method, which is held in the management DB 160. In this example, information representing a billing method to be applied to each guest is registered in correspondence with the guest ID, besides items (omitted in FIG. 22) illustrated by way of example in FIG. 16. In the case where payment by cash, emoney, debit card, credit card, or the like is used, for example, identification information that identifies the type of billing method is registered in information on the billing method. In the case of cloud account settlement, identification information indicating a cloud account settlement method is registered in the billing method column. Note that, in the case where cloud account settlement is selected, the user always registers his/her cloud ID in the management DB 160. In addition, in the case of the method of changing the to-be-billed destination to an employee, division, project, or the like, a local ID or code that specifies an employee, division, or project serving as a new to-be-billed destination after the change is registered along with identification information indicating the method. For example, in the case where an employee, division, or project that invites a guest accepts a fee billed to the guest, the to-be-billed destination code (local ID or the code of a division or project) of the employee, division, or project is simply registered in advance as a to-be-billed destination in management information on the guest in the management DB 160. In the example illustrated in FIG. 22, as a billing method corresponding to the guest management information ID "gt125678", changing of the to-be-billed destination to the account of the project "pr1234" is specified.

In the case where payment by cash, emoney, debit card, or credit card is selected as a guest's billing method, for example, at the time the guest returns a guest IC card upon exiting, the receptionist simply settles the amount of fee with the guest by using the selected method. In the case where payment by cash is selected, the receptionist simply accepts payment by cash from the guest. In the case of payment by credit card, credit settlement is simply done at the reception. In the settlement, the reception terminal 170 accesses the aggregation apparatus 150, receives information on the amount of fee corresponding to the guest ID of the guest, and asks the guest to pay the amount of fee (here, it is assumed that, for each guest ID, the aggregation apparatus 150 collects the amount of fee in each piece of log information including the guest ID). Among items of log information of processing performed with each guest ID, each image forming apparatus 130 sends at least information necessary for determining the amount of fee to the aggregation apparatus 150 immediately after execution of processing, without waiting for the timing to collect log information from the aggregation apparatus 150. Accordingly, settlement may be done at the reception at the time a guest exists.

Note that the amount of fee is simply calculated on the basis of a unit price according to each type of processing for which a guest has given an instruction and the amount of processing (the number of outputs). The type of processing is, for example, a combination of distinction between monochrome output and color output, distinction among copying, printing, and facsimile sending, and whether to use the cloud.

In the case where it has been specified to perform cloud account settlement or to change the to-be-billed destination to an in-house to-be-billed destination, settlement processing at the reception is unnecessary, and the amount of fee billed to the guest is simply added to the cloud account or the code of the specified in-house to-be-billed destination.

In determination of a to-be-billed destination regarding each piece of log information of each guest, for example, the aggregation apparatus 150, which has received log information from the image forming apparatus 130, refers to the management DB 160 to specify a billing method, determines a to-be-billed destination in accordance with the billing method, and records the to-be-billed destination in log information. In another example, the image forming apparatus 130 may refer to the management DB 160 to determine a billing method (and further a to-be-billed destination if necessary). In this case, information on the determined billing method (and further the to-be-billed destination if necessary) is set as a uniquely defined element in a logical printer 210 in the cloud print service 200. Accordingly, the image forming apparatus 130 is able to obtain a to-be-billed destination for print data coming from the logical printer 210, from a print ticket that accompanies the print data, in the same or similar method as the case of a local ID. In another example, information on the determined billing method (and further the to-be-billed destination if necessary) may be stored in the image forming apparatus 130, and the billing method (and the to-be-billed destination) may be recorded in log information of executed processing.

FIG. 23 illustrates an example of data content of log information recorded by the aggregation apparatus 150 in this example. In this example, in addition to the items illustrated by way of example in FIG. 17B, "to-be-billed destination" information is recorded. In the case where an employee, division, or project is a to-be-billed destination (or a new to-be-billed destination after the change), the local ID of the employee, the division code of the division, or the project code of the project is recorded in the to-be-billed destination. In the case where a guest or the like personally settles the fee as in credit card settlement, this billing method is recorded as information on the to-be-billed destination. Although omitted in the drawing, the aggregation apparatus 150 collects, from these pieces of log information, the total amount of fee billed to each local ID, each division code, each project code, and each guest information management ID. The result of collecting the total amount of fee of a guest is referred to upon settlement of the fee billed to the guest at the reception or the like. The fee billed to a local ID or division ID is settled in-house as has been done previously.

In the above example, changing the to-be-billed destination in the case where the user gives a print instruction from the UI unit 132 of the image forming apparatus 130 to the cloud print service 200 has been described. Meanwhile, it is possible to change the to-be-billed destination also in the case in which the user directly gives a print instruction to the cloud print service 200 (without via the image forming apparatus 130) while specifying the image forming apparatus 130 as an output destination. Note that, when the user directly gives a print instruction to the cloud print service 200, the cloud print service 200 does not provide a user interface for selecting a to-be-billed destination (in the first place, choices of a to-be-billed destination are in-house information, and the cloud print service 200 has no concern therewith). Therefore, a to-be-billed destination in the case where the user directly gives a print instruction to the cloud print service 200 is uniquely fixed by the user, instead of being selected.

For example, in the case of an employee, a code (local ID or a division or project code) indicating a to-be-billed destination (the employee, a division, a project, or the like) is registered in association with the employee's local ID and cloud ID in the cloud print management server 120 or the conversion table 142. In the case where a cloud ID that accompanies print data that comes from the cloud print service 200 matches none of pairs of a local ID and a cloud ID, which are currently stored in the image forming apparatus 130 (that is, pairs of IDs of each user currently and locally using that image forming apparatus 130), the image forming apparatus 130 registers the cloud ID, which accompanies the print data, in a log. The aggregation apparatus 150, which has aggregated that log, obtains, from the conversion table 142 or the like, to-be-billed destination information corresponding to the cloud ID recorded in the log, and adds the obtained to-be-billed destination to the log information. Needless to say, instead of the aggregation apparatus 150, the image forming apparatus 130 may determine and record the to-be-billed destination.

In the case of a guest, the guest's cloud ID and billing method information are registered in the guest ID management information (see FIG. 22). Therefore, in the case where a cloud ID that accompanies print data that comes from the cloud print service 200 matches none of the currently stored pairs of a local ID and a cloud ID, the image forming apparatus 130 registers the cloud ID, which accompanies the print data, in a log. The aggregation apparatus 150, which has aggregated that log, obtains, from the guest ID management information, to-be-billed destination information corresponding to the cloud ID recorded in the log, and adds the obtained to-be-billed destination to the log information. Needless to say, instead of the aggregation apparatus 150, the image forming apparatus 130 may determine and record the to-be-billed destination.

Other Processing Using Cloud

So far, the case in which printing is performed with the image forming apparatus 130 using the cloud print service 200 has been described by way of example. However, there are various types of processing performed by the image forming apparatus 130 using print data (in the PDF format or the like) from the cloud print service 200, besides directly printing the print data. Hereinafter, some examples will be described.

(a) Security Printing

One example is security printing. Security printing is generally a method used to prevent, in response to a print instruction given by a user from a PC or the like to the image forming apparatus 130, a printed sheet from being exposed to other people before the user comes to a place where the image forming apparatus 130 is located and obtains the printed sheet output to an output tray of the image forming apparatus 130. In security printing, the image forming apparatus 130 does not promptly print print data received from a PC or the like or output the printed result to the output tray; the image forming apparatus 130 saves the print data (or image data for printing, generated from the print data) in a storage area secured in a corresponding memory in association with a local ID. When the user comes to the image forming apparatus 130 and is authenticated using a local ID by using an IC card or the like, printing and outputting of the print data held in a storage area corresponding to the user is performed.

Such security printing is realized in the exemplary embodiment as follows. A user logs in to the cloud print service 200 from the user's terminal such as a PC or smart phone, inputs specification of print data to be printed, various types of print setting such as the number of prints, specification of the image forming apparatus 130 at an output destination, the user's local ID, and specification to perform security printing, and gives a print instruction including these pieces of information to the cloud print service 200. Information of this print instruction is simply generated by the terminal in the form of, for example, a print ticket, and sent to the cloud print service 200. In response to this print instruction, the cloud print service 200 generates print data, and sends the print data, together with a print ticket including the user's cloud ID and specification of security printing, to the image forming apparatus 130. Upon reading information that specifies a security printing function from the print ticket, the image forming apparatus 130 obtains from the conversion table 142 a local ID corresponding to the cloud ID included in the ticket, and saves the print data in a storage area corresponding to the obtained local ID. When a user with the local ID gives an instruction to perform user authentication on the image forming apparatus 130 and when it is determined that the authentication is appropriate, the image forming apparatus 130 prints and outputs the print data in the storage area corresponding to the local ID.

In addition, there is a method in which a storage area is shared by multiple people, and, in response to inputting, by a user to the image forming apparatus 130, authentication information corresponding to the storage area (such as a password set for the storage area), print data saved in the storage area is printed and output. In the case where security printing in such a method is realized by using the cloud, it is simply necessary for print instruction information such as a print ticket sent from a terminal to the cloud print service 200 to include, as uniquely defined information, information that identifies a storage area of print data that specifies the storage area. Here, since the cloud print service 200 does not provide a user interface for inputting uniquely defined information, for example, an application that accepts an input of a print instruction to the cloud print service 200 is installed in a terminal, and that application accepts an input of uniquely defined information. In this case, the application generates a print ticket including the accepted uniquely defined information, and gives a print instruction including the print ticket to the cloud print service 200. The cloud print service 200 sends print data of a document specified by the user, along with the print ticket received from the terminal, to the image forming apparatus 130. The image forming apparatus 130 stores the print data in a storage area indicated in the print ticket.

When a user performs user authentication on the image forming apparatus 130 and enters authentication information corresponding to the storage area, print data saved in the storage area is printed and output. In this case, a local ID specified by the user authentication is recorded in log information. In addition, "security printing" may be recorded as the type of processing in the log information.

In addition, there is a known function in which, a job flow, described later, is associated with a security box, and, in response to inputting of print data to the security box, the associated job flow is executed. This function may be applied to print data input from the cloud print service 200.

In this example, in the case where a print ticket transferred along with print data from the cloud print service 200 to the image forming apparatus 130 includes information that specifies a storage area of the print data, the print data is input to the storage area. In the case where the storage area is associated with a job flow describing a series of processes, the image forming apparatus 130 executes the series of processes described in the job flow on the print data saved in the storage area. The series of processes on the print data may be processing performed by the image forming apparatus 130, such as image processing or format conversion processing, or may be processing such as transfer processing to another apparatus or processing performed by this other apparatus.

(b) Facsimile Sending and Email Sending

A user's document data in the cloud may be sent via facsimile from the image forming apparatus 130 via the cloud print service 200. To perform facsimile sending using the cloud, after user authentication, the user inputs information that specifies document data to be sent, the facsimile number of a destination, and the like to the image forming apparatus 130.

In one example, in response to this input, the image forming apparatus 130 sends a print ticket including the user's local ID and the facsimile number of the destination as uniquely defined information to the cloud print service 200, and prepares a logical printer 210 in which the local ID and the facsimile number of the destination are set in the cloud print service 200. In addition, the logical printer 210 converts document data specified as a to-be-transmitted target to print data in the PDF format or the like, and sends the print data along with a print ticket including the local ID and the facsimile number of the destination, set in the logical printer 210, to the image forming apparatus 130. In the case where the print ticket, received along with the print data, includes the facsimile number of the destination, the image forming apparatus 130 sends the print data (or image data generated by analyzing the print data) via facsimile to the facsimile number of the destination.

In another example, the image forming apparatus 130 stores a destination facsimile number input by the user, and sends print data that comes from the cloud print service 200 to the stored destination facsimile number.

Using the same or similar method, the image forming apparatus 130 may send document data in the cloud to the email address of a destination, specified by a user.

In the case where a facsimile is sent or an email is sent as above, destination information is recorded in log information.

(c) Job Flow Processing

There is known technology for performing a series of coordinated services (referred to as a "job flow") on data by coordinating one or more processing functions on various types of data provided by the image forming apparatus 130, a server in the in-house network 100, or a server on the Internet 400. A job flow realizes one coordinated service on data by performing processing while transferring, among processing functions, services, or apparatuses, print data or the result of processing in accordance with flow definition data (hereinafter referred to as "instruction data") which is data describing a series of processes. Data includes description of the execution order of a series of processes configuring a job flow, information that specifies an apparatus or application that execute each process (such as the IP address of an apparatus or a server or information that identifies a processing application), and information on the content of a process executed by the apparatus or the like (the type of process, a parameter used in the process, etc.). Schematically, processing result data in an apparatus or the like defined as an apparatus or the like that performs each process in a job flow is transferred to the next apparatus in a procedure defined in the job flow, and this next apparatus or the like further performs processing on the processing result data in accordance with information on the content of the process performed by the next apparatus or the like in the procedure described in the instruction data.

For example, an exemplary job flow is the flow of a series of processes on data, including (a) printing input print data, (b) extracting text data from the print data, and (c) sending an email including the text data as attached data to a specified email address. In this case, the processes (a) and (c) are executed by, for example, the image forming apparatus 130, and the process (b) is executed by, for example, an in-house server. In this example, the image forming apparatus 130 prints print data received along with instruction data in which the job flow is defined, and transfers the print data along with the instruction data to a server that performs text data extraction processing, which is the process (b). The server executes processing to extract text data from the print data in accordance with an instruction indicated in the instruction data, and transfers the extracted text data along with the instruction data to the image forming apparatus 130. The image forming apparatus 130 generates an email including the text data, and sends the email to a destination email address indicated in the instruction data.

Such a job flow is specifiable as the output destination of print data provided from the cloud print service 200 to the image forming apparatus 130.

In one example, upon receipt of an instruction given from a user to execute job flow processing on a document in the cloud, the image forming apparatus 130 sets, in a logical printer 210 in the cloud print service 200, information that specifies the job flow given in the instruction (such as a flow ID that is identification information that specifies the job flow). This setting is simply performed, as with the case of setting the above-described to-be-billed destination in a logical printer 210, by giving an instruction to generate a logical printer 210 or to update setting in an existing logical printer 210 using a print ticket or setting information (such as PrintCapability) representing the capability of the image forming apparatus 130. In one example, using a print ticket including a flow ID as a uniquely defined element, the flow ID is set in the logical printer 210 (or such a logical printer 210 is generated). In the case where a to-be-billed destination is specified, the to-be-billed destination code may be included in the print ticket, and the to-be-billed destination code may also be set in the logical printer 210.

For example, in the case where a job flow is also presented as a processing choice besides printing, copying, and facsimile sending on the UI unit 132 of the image forming apparatus 130 and a user selects the job flow from among these choices, the user is prompted to further select one from among multiple job flows prepared in advance. The flow ID of the job flow selected by the user is included in a print ticket, and the print ticket is sent to the cloud print service 200, thereby setting the flow ID of the job flow in a logical printer 210.

Pieces of definition information (instruction data) of multiple job flows serving as choices are held in association with flow IDs in, for example, the image forming apparatus 130. In another example, these pieces of instruction data are held in a server (referred to as a "flow server") located in the in-house network 100 or the Internet 400, and the image forming apparatus 130 obtains instruction data corresponding to a flow ID specified by a user from the flow server or requests the flow server to execute the instruction data corresponding to the flow ID.

The foregoing examples describe the method of providing, every time specification of a job flow to be executed is received from a user, a logical printer 210 in which the flow ID of the job flow is set in the cloud print service 200.

In contrast, as another method, a logical printer 210 in which, for each job flow, the flow ID of the job flow is set as a uniquely defined element may be prepared in the cloud print service 200. In this case, the image forming apparatus 130 is capable of accessing information on the corresponding relationship between a flow ID and a logical printer 210. The image forming apparatus 130 specifies, on the basis of the information, a logical printer 210 corresponding to a flow ID selected by a user as an execution target, and gives an instruction to the specified logical printer 210 to process document data specified separately by the user as a processing target.

In any of the above methods, a logical printer 210 in which a flow ID representing a job flow for which a user has given an instruction exists in the cloud print service 200, and the logical printer 210 is specified as a device in charge of processing to-be-processed document data. The image forming apparatus 130 sends, to the logical printer 210, for example, an instruction to output document data in a cloud repository service. This output instruction may be a print instruction corresponding to the logical printer 210 (that is, in realization of the job flow, it is unnecessary to alter a program in the logical printer 210). The logical printer 210, which has received the instruction, processes the document data to generate print data (in the PDF format, for example), and sends the print data along with a print ticket that includes the set flow ID as a uniquely defined element to the image forming apparatus 130.

The image forming apparatus 130, which has received the print data and the print ticket, detects the flow ID from the print ticket, and recognizes that processing to be performed on the print data is not printing but a job flow corresponding to the flow ID. In this case, the image forming apparatus 130 specifies, from among pieces of instruction data held therein, instruction data corresponding to the flow ID, and executes processing described in the instruction data. Accordingly, processing realized by coordination between one or more processing apparatuses (the image forming apparatus 130, a server, and the like) described in the instruction data is applied to the print data. Having executed the job flow, the image forming apparatus 130 records the flow ID of the job flow in log information.

In the case where, in the image forming apparatus 130, there is no instruction data corresponding to the flow ID included in the print ticket, the image forming apparatus 130 accesses the flow server (the image forming apparatus 130 knows how to access the flow server) and obtains instruction data corresponding to the flow ID from the flow server or gives an instruction to the flow server to execute instruction data corresponding to the flow ID. Even in the case where the flow server executes the instruction data, each processing apparatus described in the instruction data is caused to execute corresponding processing. Thus, the content of executed processing remains unchanged.

In the foregoing example, the ID of a job flow for which a user has given an instruction is set in a logical printer 210, and a print ticket including the flow ID along with print data from the logical printer 210 is provided to the image forming apparatus 130. However, this is only exemplary. In principle, it is only necessary that the content of a job flow for which a user has given an instruction be specifiable from a print ticket coming along with print data from the logical printer 210. In an extreme example, the instruction data of a job flow itself may be set as a uniquely defined element in the logical printer 210, and a print ticket including the instruction data may be caused to arrive at the image forming apparatus 130.

In another example, there is a method in which the image forming apparatus 130 stores a flow ID input by the user, and executes a job flow corresponding to the stored flow ID on print data that comes from the cloud print service 200.

(d) Outputting from Another Printer

For example, in the case where the image forming apparatus 130 is a multifunctional apparatus for office use, the image forming apparatus 130 is incapable of printing on a plastic card. However, such special printing unexecutable by the image forming apparatus 130 may be executed using the cloud print service 200. For example, a printer in the in-house network 100 that is capable of printing on a plastic card is not provided with a UI function for giving an instruction to perform processing using the cloud print service 200, and an instruction is given to the cloud using the UI function of the image forming apparatus 130.

In this case, a user inputs information that specifies a printer at an output destination (such as an IP address), an output parameter to be transferred to the output destination (such as information that specifies a medium at the output destination), and the like to the image forming apparatus 130. In one example, the image forming apparatus 130 sets these pieces of information as uniquely defined elements in a logical printer 210 by using the same or similar method as setting the above-described to-be-billed destination. The image forming apparatus 130 specifies document data to be printed and gives an instruction to the logical printer 210 to print the document data.

In response to this, the logical printer 210 generates print data by processing the document data, and sends the print data along with a print ticket including the information which specifies the printer at the output destination, the output parameter, and the like as uniquely defined elements to the image forming apparatus 130. The image forming apparatus 130, which has received the print data and the print ticket, transfers the print data to the printer to print the print data when the image forming apparatus 130 has detected the information on the printer at the output destination from the print ticket. In transfer of the print data, the output parameter included in the print ticket is additionally transferred, and hence printing in accordance with the output printer may be performed.

In another example, the image forming apparatus 130 may store information that specifies a printer at an output destination and output parameters, which are input by the user. In this case, upon receipt of print data from the cloud print service 200, the image forming apparatus 130 transfers the print data and the output parameters to the printer at the output destination in accordance with the stored information.

(e) Conclusion

As has been described above, various functions executable by the image forming apparatus 130 on print data sent from an apparatus in the in-house network 100 or image data read with the scan function of the image forming apparatus 130 are also executable on print data sent from the cloud print service 200 to the image forming apparatus 130.

Output Restriction

An output restriction, based on user authority, on output processing from the image forming apparatus 130 using the cloud print service 200 will be described.

For processing such as printing or copying closed in the in-house network 100, control has hitherto been performed in which the use authority of each individual user is determined and use is permitted within the authority. Hereinafter, an example in which such use authority control for each individual is applied to processing using the cloud print service 200 will be described.

In this example, each user's use authority information for the image forming apparatus 130 in the in-house network 100 is registered in the management DB 160 (see FIG. 14). FIG. 24 illustrates an example of use authority information.

In the example illustrated in FIG. 24, information on each user's various types of authority is indicated in association with the user's local ID. In the illustrated example, the use authority information includes information indicating whether the user has authority to use color printing and double-sided printing, the maximum number of output prints permitted to the user at present, and whether the user has authority to use each of the basic functions including printing, copying, facsimile sending, and scanning. The value of the maximum number of output prints is updated every time the user executes processing, such as printing, using the image forming apparatus 130, for example. In another example, the maximum number of output prints is updated in accordance with the result of aggregation every time the aggregation apparatus 150 aggregates log information of processing executed by the image forming apparatus 130. That is, for example, the sum of output prints in processing executed after the last aggregation timing is subtracted from the maximum number of output prints.

In addition, in the example illustrated in FIG. 24, the use authority information includes information on various types of use authority for each temporary ID (in this example, the temporary ID may take a value within the range from "fx50001" to "fx59999") and each guest ID (in this example, the guest ID may take a value within the range from "fx90001" to "fx99999").

Figure 25:
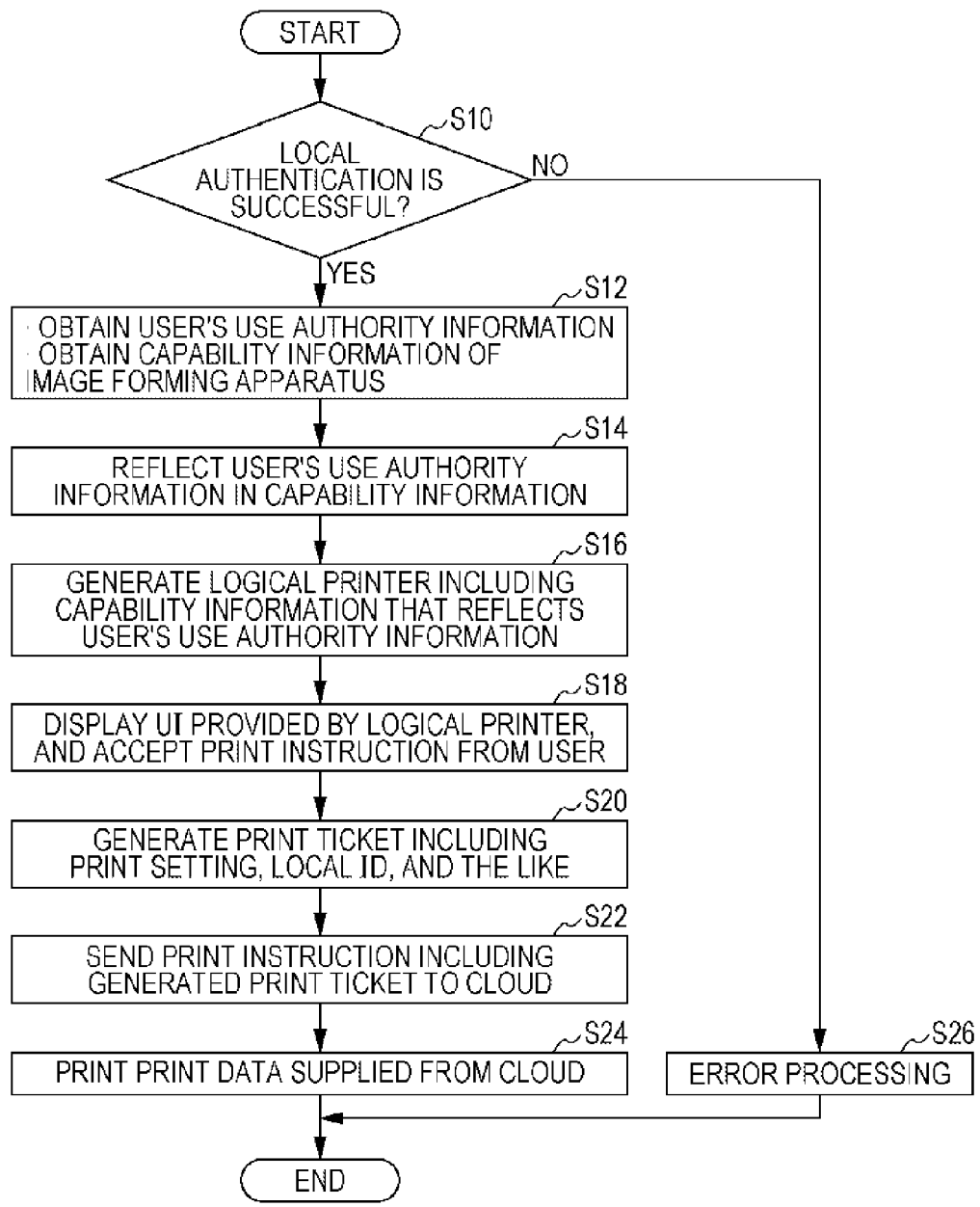
FIG. 25 is a diagram illustrating an example of the procedure of a process for realizing output restriction in accordance with the use authority of each user by using a cloud print service.

FIG. 25 illustrates an example of the procedure of a process performed by the image forming apparatus 130 in this example. In this procedure, the image forming apparatus 130 performs user authentication using an IC card or the like (S10), and, if the authentication is successful, the image forming apparatus 130 obtains the user's use authority information from the management DB 160, and obtains the capability information of the image forming apparatus 130 itself (S12). In the obtained capability information of the image forming apparatus 130, the current state of the image forming apparatus 130 (such as the type and number of sheets set in a sheet feeding unit) may be reflected.

By reflecting the user's use authority information in the capability information of the image forming apparatus 130 (that is, by more restricting the capability information in accordance with the use authority information), capability information specialized for the user is generated (S14). For example, in the case where the image forming apparatus 130 has both color printing and monochrome printing functions and the user only has authority to use monochrome printing, capability information specialized for the user is restricted to the monochrome printing function only. In another example, in the case where the image forming apparatus 130 has the facsimile sending function whereas the user has no authority to use facsimile sending, capability information specialized for the user has no facsimile sending function. In addition, the maximum number of output prints may be incorporated in the capability information specialized for the user. Information on the maximum number of output prints is used to determine, for example, the upper limit value of output prints specifiable by the user.

The image forming apparatus 130 sends the capability information specialized for the user, generated in step S14, to the cloud print service 200 in the form of, for example, setting information (such as PrintCapability) representing the capability of the image forming apparatus 130, and generates a new logical printer 210 that has the capability information specialized for the user as the setting information of the image forming apparatus 130 (S16). Alternatively, the image forming apparatus 130 sets the capability information specialized for the user as the setting information of the image forming apparatus 130 in an existing logical printer 210 (S16).

In response to specifying, by the user, in the logical printer 210 in which the capability information specialized for the user has been set, the image forming apparatus 130 as an output destination, a processing parameter setting UI in accordance with the capability setting information of the image forming apparatus 130 set in the logical printer 210 is provided from the logical printer 210 to the image forming apparatus 130 (S18). For example, in the case where the capability information specialized for the user indicates that both color printing and monochrome printing are possible, double-sided printing is impossible, and facsimile sending is possible, choices for selecting one of printing and facsimile sending are presented in the processing parameter setting UI, and, in the case where printing is selected, choices for selecting whether to perform color or monochrome printing are presented. In this case, even when the image forming apparatus 130 itself has the double-sided printing function, the choice of double-sided printing is not presented in the processing parameter setting UI. Alternatively, instead of the logical printer 210 generating a processing parameter setting UI, the logical printer 210 may transfer the setting information of the image forming apparatus 130 (the capability information specialized for the user) to the image forming apparatus 130, and the image forming apparatus 130 may generate a processing parameter setting UI from the setting information.

The user inputs setting items to the processing parameter setting UI (S18). That is, the user selects a desired choice(s) from among the choices presented by the processing parameter setting UI, and, if necessary, inputs the value of the number of output prints, for example (the number of output prints inputtable here may be restricted in accordance with the maximum number of output prints). In response to this, the image forming apparatus 130 generates a print ticket including the content of the processing parameter settings (such as the result of choice(s) selected by the user and an input made by the user) (S20), and sends a processing instruction including the print ticket to the logical printer 210 (S22).

The logical printer 210 converts document data to be processed, indicated by the processing instruction, to print data, and sends the print data along with the print ticket including the content of the processing parameter settings to the image forming apparatus 130. In accordance with the processing parameters indicated in the print ticket, the image forming apparatus 130 processes (such as prints) the print data (S24).

If the user authentication is unsuccessful in step S10, the image forming apparatus 130 performs error processing such as displaying an error message (S26).

In the example illustrated in FIG. 25, if the user authentication is successful, the flow proceeds to step S12 onward. Alternatively, after the user authentication is successful, only when the user inputs an instruction to use the cloud print service 200, the process may proceed to step S12 onward. In the case where the user specifies processing that does not use the cloud print service 200 (such as local copying or facsimile sending), the specified processing is simply executed, as has been conventionally done.

In the above-described output restriction mechanism, for a user who has performed user authentication with a temporary ID, in one example, in generation of capability information (PrintCapability) specialized for the user in step S14, default use authority information for a temporary ID, illustrated in FIG. 24 by way of example, is used. In another example, a regular local ID corresponding to the temporary ID is specified, and use authority information corresponding to the regular local ID is used. Such a method is adoptable if it only takes a short period of time to specify a regular local ID corresponding to a temporary ID.

In the above example, capability information reflecting the user's use authority is set in the logical printer 210 in the cloud print service 200, and the cloud print service 200 provides the print setting UI reflecting the capability information to the image forming apparatus 130. However, this is only exemplary. In another example, another method may be used in which the image forming apparatus 130 generates a print setting UI reflecting the user's use authority, stores print settings input to the UI by the user, and, upon receipt of print data from the cloud print service 200, executes printing in accordance with the stored print setting information.

Notification Regarding Processing

Hereinafter, a service in which, in the case where the image forming apparatus 130 executes processing for which an instruction has been given by a user, notification regarding the processing is given to the user or other people concerned will be described.

Figure 26:
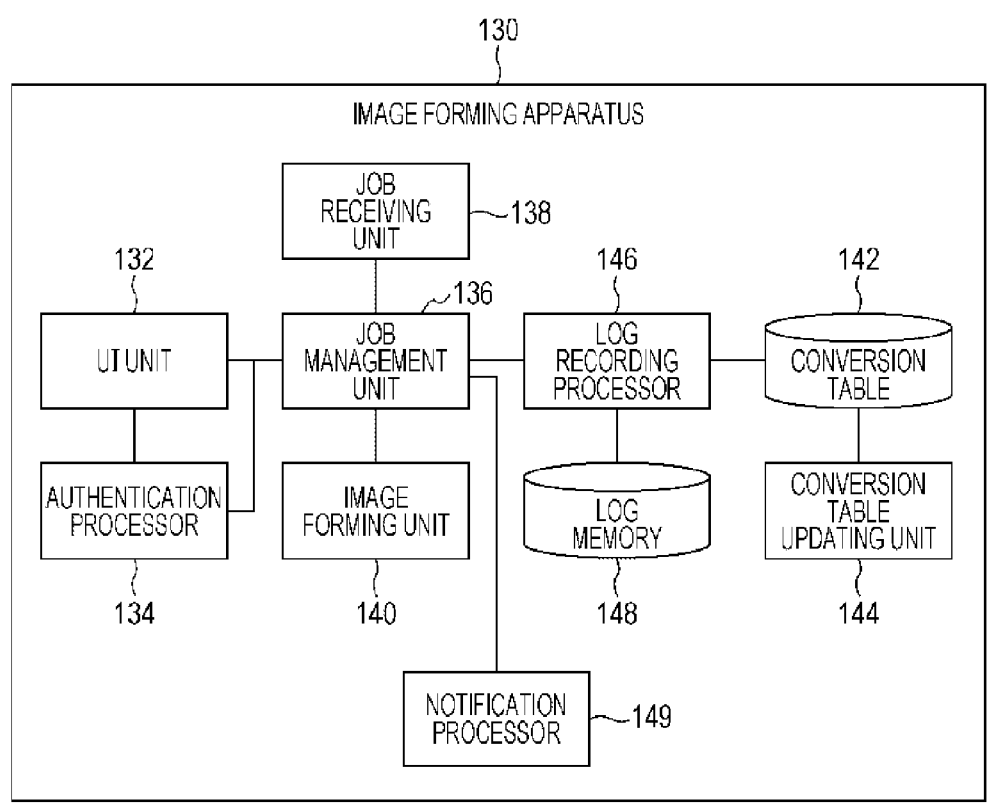
FIG. 26 is a diagram illustrating an example of the image forming apparatus including a notification processor.

In this example, as illustrated in FIG. 26, the image forming apparatus 130 includes a notification processor 149. The notification processor 149 executes notification processing described below by way of example. Note that elements other than the notification processor 149 of the image forming apparatus 130 illustrated in FIG. 26 are the same as or similar to elements with the same reference numerals illustrated in FIG. 6.

In one example, in the case where a user performs printing processing with the image forming apparatus 130 using the cloud print service 200, the image forming apparatus 130 notifies the user of the processing result via the cloud service using the user's cloud ID. Notification is simply given by using an email service or a message service (such as a short message service) provided by the cloud service. That is, in the case where the cloud service manages destination information corresponding to the cloud ID, the cloud services gives notification using the destination information.

For example, in the case where printing is performed using Google Cloud Print, the user is notified using Gmail (registered trademark), which is an email service, or Google Talk (registered trademark), where the same Google account is usable.

Since the cloud ID (cloud account) has already been input at the time the user has used the cloud print service 200, it is only necessary to specify the cloud ID as a destination and to request the cloud service to notify the user.

In another example, in the case where a user is authenticated by using his/her regular local ID and gives a processing instruction (in this case, the user is an employee), notification regarding the processing is sent to a contact destination (such as an email address, see FIG. 18) registered in the management DB 160 in association with the local ID.

Meanwhile, for processing for which a user has given instruction using an ID whose corresponding contact destination is not registered in the management DB 160, as in a guest ID or a temporary ID, the image forming apparatus 130 sends notification regarding the processing via the cloud service using the user's cloud ID.

The content of notification sent by the image forming apparatus 130 to a user who has given a processing instruction includes, for example, the actual result value of the processing (such as the number of output prints) and the user's upper limit value of the number of outputtable prints updated by reflecting the actual result value.

In addition, the image forming apparatus 130 may send notification regarding processing to those who are concerned, other than a user who has given an instruction to perform the processing. In one example, in the case where a user uses the image forming apparatus 130 using a temporary ID or a guest ID, a predetermined administrator who administers such local IDs and guest IDs is notified of the content of processing performed by the user. Address information (such as an email address) of the administrator at a notification destination is either set in the image forming apparatus 130 or is obtainable by the image forming apparatus 130 from a certain apparatus in the in-house network 100.

Notification sent by the image forming apparatus 130 to the administrator may include, for example, the processing time and date, identification information of the image forming apparatus 130 which has performed the processing, identification of the user who has given the processing instruction (obtainable information from among a temporary ID, guest ID, cloud ID, name, and the like), various types of information indicating the content of the processing (such as the processing type, processing parameters, number of output prints, and image data or an image serving as a processing target). Needless to say, the administrator may not necessarily be notified of all the pieces of information given above, and may be notified of information other than those pieces of information given above. The administrator refers to information included in the notification and checks the user's temporary use state of the image forming apparatus 130.

In addition, in the case where a destination to which the fee for processing executed by the image forming apparatus 130 is to be billed is changed to a person other than the user who has given an instruction to execute the processing, the image forming apparatus 130 may notify the new to-be-billed destination of information regarding the processing. In one example, the new to-be-billed destination after the change is determinable from a to-be-billed destination element (see FIG. 21) included in a print ticket that comes from the cloud print service 200 along with print data, and the contact destination address of the new to-be-billed destination is simply obtained from information on the contact destination included in management information (see FIGS. 18 to 20) of users (employees), divisions, and projects held by the management DB 160. In another example, the image forming apparatus 130 stores a new to-be-billed destination selected by the user, and, when the image forming apparatus 130 executes processing for which an instruction has been given from the user, the image forming apparatus 130 records the new to-be-billed destination in a log, and the notification processor 149 notifies the new to-be-billed destination. In yet another example, in the case where the user directly accesses the cloud print service 200 and gives a print instruction or the like, the image forming apparatus 130 determines, from the conversion table 142 or the guest ID management information, a to-be-billed destination corresponding to a cloud ID sent along with print data from the cloud print service 200, and, if the determined to-be-billed destination is a new to-be-billed destination, the image forming apparatus 130 notifies the new to-be-billed destination.

The new to-be-billed destination is simply notified of the same or similar information as the above-described administrator. Reading the notification, a person in charge at the new to-be-billed destination is able to check whether abnormal processing such as mass printing has been performed.

Instead of notifying the administrator or the new to-be-billed destination of all processes serving as targets (such as all processes whose to-be-billed destinations have been changed), the administrator or the new to-be-billed destination may be notified of, among these processes serving as targets, processes that satisfy a predetermined notification condition. The notification condition is a condition for extracting a process that is highly likely to be abnormal, to which the administrator or the new to-be-billed destination should pay special attention. Specific examples of the notification condition include the fact that the number of prints that exceeds a predetermined threshold are printed at one time, the fact that the sum of output prints processed in response to a user instruction(s) given within a most recent period exceeds a predetermined threshold, and the fact that print data including a character string or an image (such as a secret mark) that is determined in advance to be monitored is output.

In one example, for each type (regular, temporary, or guest) of local ID used for authentication, whether to notify the user, whether to notify the administrator, and whether to notify the new to-be-billed destination are set in the image forming apparatus 130. This setting may be made not for each type of local ID, but for each local ID. In addition, for each type of notification destination (user, administrator, or new to-be-billed destination), items of notification information are set in the image forming apparatus 130. The notification processor 149 of the image forming apparatus 130 specifies a notification destination in accordance with the setting, obtains address information of the specified notification destination from the management DB 160 or the like, and sends notification including the set information items to each notification destination.

Alternatively, processing described as being executed by the aggregation apparatus 150 in the above-described examples may be executed by a built-in computer in the image forming apparatus 130.

The information processing function parts (parts that execute a function module group other than the image forming unit 140 in the example illustrated in FIG. 6) of the cloud print management server 120 and the image forming apparatus 130, which are described above by way of example, are realized by running, for example, on a general computer, a program that represents processing of the individual function modules of the cloud print management server 120 and the image forming apparatus 130. Here, the computer has a circuit configuration in which, as hardware, a microprocessor such as a central processor (CPU), memories (main storages) such as a random-access memory (RAM) and a read-only memory (ROM), a hard disk drive (HDD) controller that controls an HDD, various input/output (I/O) interfaces, a network interface that performs control for connection with a network such as a LAN, and the like are interconnected via, for example, bus. Further, for example, a disk drive for reading and/or writing data from/to portable disk recording media, such as a compact disc (CD) and a digital versatile disc (DVD), via an I/O interface, and a memory reader/writer for reading and/or writing data from/to portable non-volatile recording media in various standards, such as a flash memory, may be connected to the bus. A program in which the contents of the processing of the individual function modules described above by way of example are written is saved in a fixed storage such as an HDD via a recording medium such as a CD or a DVD or via a communication tool such as a network, and the program is installed in the computer. The program stored in the fixed storage is read to the RAM and executed by the microprocessor such as the CPU, thereby realizing the function module group described above by way of example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus that performs printing processing using first identification information that is information for identifying, in a first system in a particular organization that performs first authentication, a user in the first authentication, comprising:

an obtaining unit configured to obtain print data from a logical printer in a second system that is a cloud service system that performs second authentication, wherein information for identifying the user in the second system is second identification information, and the print data includes the second identification information;

a controller configured to obtain the first identification information by referring to relationship information between the first identification information and the second identification using the second identification information included in the obtained print data, and configured to control printing processing of the obtained print data using the obtained first identification information;

a use authority obtaining unit configured to obtain, from a use authority memory device in the first system, use authority information indicating whether the user who has been authenticated by the first authentication using the first identification information has authority to use the image forming apparatus;

a generating unit configured to generate restricted capability information by further restricting information on capability of the image forming apparatus in accordance with the user's use authority information obtained by the use authority obtaining unit; and a providing unit configured to provide, to the user, a setting information inputting user interface corresponding to the generated restricted capability information, wherein identification information of the user, which is temporarily issued in the first system, is used as the first identification information.

2. The image forming apparatus according to claim 1, wherein, in a case where the first identification information corresponding to the second identification information included in the obtained print data is the user's temporarily issued identification information, a fee for the printing processing is recorded as a fee billed to a to be-billed destination.

3. The image forming apparatus according to claim 1, further comprising a log memory configured to record log information including the second identification information included in the obtained print data, the first information of the user corresponding to the second identification information, and log image data representing the obtained print data or a to-be-printed image generated from the obtained print data.

4. The image forming apparatus according to claim 1, further comprising a notification unit configured to notify the user who has the second identification information of information regarding the printing processing of the obtained print data, via the second system using the second identification information.

5. A non-transitory computer readable medium storing a program causing a computer to execute a process, the process comprising:

obtaining print data from a logical printer in a second system that is a cloud service system that performs second authentication, the print data including second identification information that is user identification information in the second system;

obtaining first identification information by referring to relationship information between the first identification information and the second identification information using the second identification information included in the obtained print data, the first identification information being user identification information in a first system in a particular organization including an image forming apparatus that performs first authentication;

controlling printing processing of the obtained print data using the obtained first identification information;

obtaining, from a use authority memory device in the first system, use authority information indicating whether the user who has been authenticated by the first authentication using the first identification information has authority to use the image forming apparatus;

generating restricted capability information by further restricting information on capability of the image forming apparatus in accordance with the user's obtained use authority information; and providing, to the user, a setting information inputting user interface corresponding to the generated restricted capability information, wherein identification information of the user, which is temporarily issued in the first system, is used as the first identification information.

6. An image forming system comprising:

a management apparatus connected to a first system in a particular organization that performs first authentication; and one or more image forming apparatuses, wherein the management apparatus includes an accepting unit configured to accept an input of user setting information including (i) first identification information of a user to be registered, the first identification information being user identification information in the first system, (ii) second identification information that is user identification information in a second system that is a cloud service system that performs second authentication, and (iii) identification information of a logical printer in the cloud service system which performs the second authentication, the user being registered in the cloud service system, a generating unit configured to generate corresponding relationship information representing a corresponding relationship between the first identification information and the second identification information included in the user setting information, a user setting unit configured to set, in the logical printer, the second identification information included in the user setting information as identification information of a user capable of using the logical printer corresponding to the identification information of the logical printer included in the user setting information, wherein the one or more image forming apparatuses each include a print data obtaining unit configured to obtain print data including the second identification information from the logical printer, and a controller configured to obtain the first identification information by referring to the relationship information using the second identification information included in the obtained print data, and configured to control printing processing of the obtained print data using the obtained first identification information, a use authority obtaining unit configured to obtain, from a use authority memory device in the first system, use authority information indicating whether the user who has been authenticated by the first authentication using the first identification information has authority to use the one or more image forming apparatuses, a second generating unit configured to generate restricted capability information by further restricting information on capability of the one or more image forming apparatuses in accordance with the user's use authority information obtained by the use authority obtaining unit, and a providing unit configured to provide, to the user, a setting information inputting user interface corresponding to the generated restricted capability information, wherein identification information of the user, which is temporarily issued in the first system, is used as the first identification information.

7. An image forming method comprising:

obtaining print data from a logical printer in a second system that is a cloud service system that performs second authentication, the print data including second identification information that is user identification information in the second system;

obtaining first identification information by referring to relationship information between the first identification information and the second identification information using the second identification information included in the obtained print data, the first identification information being user identification information in a first system in a particular organization including an image forming apparatus that performs first authentication;

controlling printing processing of the obtained print data using the obtained first identification information;

obtaining, from a use authority memory device in the first system, use authority information indicating whether the user who has been authenticated by the first authentication using the first identification information has authority to use the image forming apparatus;

generating restricted capability information by further restricting information on capability of the image forming apparatus in accordance with the user's obtained use authority information; and providing, to the user, a setting information inputting user interface corresponding to the generated restricted capability information, wherein identification information of the user, which is temporarily issued in the first system, is used as the first identification information.

* * * * *